United States Patent [19]
Phan et al.

[11] Patent Number: 5,726,825
[45] Date of Patent: Mar. 10, 1998

[54] METHOD FOR CARRING OUT SEEKS IN A HARD DISC DRIVE TO LIMIT THE GENERATION OF ACOUSTIC NOISE

[76] Inventors: Duc T. Phan, 19921 Buckhave La., Saratoga, Calif. 95070-5013; Mark A. Pajdowski, 135 Riviera Dr., #435, Lost Gatos, Calif. 95030

[21] Appl. No.: 656,580

[22] Filed: May 31, 1996

Related U.S. Application Data

[62] Division of Ser. No. 218,607, Mar. 28, 1994.

[51] Int. Cl.$^6$ .................................................. G11B 5/55
[52] U.S. Cl. ........................................ 360/78.07; 360/78.09
[58] Field of Search ............................. 360/78.07, 78.06, 360/78.04, 78.09

[56] References Cited

U.S. PATENT DOCUMENTS

| | | |
|---|---|---|
| 3,883,894 | 5/1975 | Johnson . |
| 4,333,117 | 6/1982 | Johnson . |
| 4,622,604 | 11/1986 | Hashimoto et al. . |
| 4,677,507 | 6/1987 | Elliott . |
| 4,899,234 | 2/1990 | Genheimer . |
| 4,907,109 | 3/1990 | Senio . |
| 4,931,889 | 6/1990 | Osafune . |
| 4,937,689 | 6/1990 | Seaver et al. . |
| 4,956,831 | 9/1990 | Sarraf et al. . |
| 4,965,501 | 10/1990 | Hashimoto . |
| 5,095,471 | 3/1992 | Sidman . |
| 5,151,639 | 9/1992 | Hasegwaga et al. ............ 360/78.09 X |
| 5,184,257 | 2/1993 | Koga et al. .................... 360/78.04 X |
| 5,345,348 | 9/1994 | Suzuki ............................... 360/78.07 |
| 5,444,583 | 8/1995 | Ehrlich et al. ...................... 360/78.09 |
| 5,475,545 | 12/1995 | Hampshire et al. ............. 360/78.07 X |

FOREIGN PATENT DOCUMENTS

| | | |
|---|---|---|
| 62-42373(a) | 8/1985 | Japan . |
| 4-162268(a) | 10/1990 | Japan . |
| 3-30152(A) | 2/1991 | Japan . |

*Primary Examiner*—Andrew L. Sniezek
*Assistant Examiner*—James L. Habermehl

[57] ABSTRACT

A method for carrying out seeks of a transducer between tracks of a disc drive to limit acoustic noise arising from changes in the acceleration of the actuator which supports the tansducer. The rate of change of the acceleration is limited utilizing three techniques; limitation of changes in the control signal outputted to an actuator driver that supplies an electrical current to the actuator that gives rise to a torque on the actuator to a preselected slew rate limit, averaging the control signal in successive repetitions of the generation of the control signal and outputting the averaged control signal during an initial portion of the time for the repetition while outputting the control signal determined in the repetition for the remainder of the time for the repetition, and determining a component of the control signal in relation to the difference between the radial velocity of the tansducer and a profile velocity determined in relation to the smaller of the distance remaining in the seek and a deceleration distance determined by multiplying the length of the seek by a predetermined factor selected to cause the tansducer to coast at substantially constant speed between acceleration and subsequent deceleration of the transducer.

5 Claims, 15 Drawing Sheets

METHOD FOR CARRING OUT SEEKS IN A HARD DISC DRIVE TO LIMIT THE GENERATION OF ACOUSTIC NOISE

This is a divisional of copending application Ser. No. 08/128,607 filed Mar. 28, 1994 pending.

BACKGROUND OF THE INVENTION

1. Field of the Invention

The present invention relates generally to improvements in hard disc drive servo methods and, more particularly, but not by way of limitation to improvements in methods for moving transducer heads radially across discs of hard disc drives.

2. Brief Description of the Prior Art

Files generated by a computer are often magnetically stored in a hard disc drive; that is, a device having one or more rotating discs that have magnetizable coatings so that transducer heads, through which a current can be passed to produce a magnetic field, that fly over the disc can magnetize data tracks that are defined in the disc coatings in patterns that reflect the content of a file. Subsequently, a file can be read by moving a transducer to the data track at which it is stored and reading the magnetic field, produced by the pattern of magnetization of the data track.

In general, the transducers are supported at the ends of flexures mounted on an electromechanical actuator that includes a coil immersed in a magnetic field so that forces can be exerted on the actuator by passing an electric current through the actuator coil. Thus, movement of a transducer between data tracks, to access a file or write a file to a selected location in the disc drive, can be carried out by supplying electrical currents to the actuator to initially accelerate the transducer from a track presently being followed and subsequently decelerate the transducer as it approaches a target track which contains the file to be accessed or to which a file is to be written.

The actuator currents are supplied by an actuator driver in response to control signals that are repetitively generated by a servo system that includes a microprocessor and it is common practice to use a velocity control approach to generate the control signals. In this approach, the location and radial velocity of the transducers across the disc surfaces are repetitively determined and the location is used to determine a profile velocity to which the actual velocity is compared to generate the control signal that is received by the actuator driver. More particularly, the control signal is commonly generated in proportion to the difference between the profile velocity and the actual velocity and the profile velocities, collectively referred to as a velocity profile, are predetermined and stored in the memory of the microprocessor for control of transducer movements. As is common, the profile velocities decrease toward zero as the distance to the target track decreases toward zero so that a transducer will generally decelerate toward a state of rest at the target track as it approaches the target track.

As is known in the art, the movement of the transducers between tracks is commonly carried out in two phases, a seek phase, in which the transducers are accelerated to the velocity profile and subsequently decelerated toward the target track until a selected minimum distance to the target track is reached, and a settle phase in which the transducer is brought to rest on the target track. Since the velocity profile decreases toward zero as the distance to the target track decreases to zero, settle can be rapidly effected once the minimum distance has been attained. Moreover, the velocity profile is generally determined to achieve rapid rates of acceleration and deceleration, with a high speed coast period between the acceleration and deceleration stages of lengthy seeks, so that the time required for accomplishing the seek phase of the movement is minimized.

While velocity control of the seek phase thus provides an efficient method of moving transducers between tracks to access selected data track in a minimum of time, it is not without problems. The acceleration of the transducer to the velocity profile and subsequent following of the profile often gives rise to rapidly changing forces on the actuator with the result that the actuator is subjected to impulses that cause vibration of the actuator and the disc drive case upon which the actuator is mounted. The vibration, in turn, gives rise to acoustic noise during the seek phase. This noise, which a computer user may find distracting, is generally considered to be an undesirable side effect of velocity control of the seek phase. Consequently, a continuing need has existed for methods that will reduce acoustic noise during transducer movements.

SUMMARY OF THE INVENTION

The present invention reduces noise during the seek phase of transducer movement in a disc drive by limiting the magnitude of changes in the control signal generated by the servo microprocessor and outputted to the actuator driver that passes electrical currents through the coil of the actuator whereon the transducers are mounted. Consequently, changes in the actuator coil current are limited to, in turn, limit the rate of change of forces applied to the actuator during acceleration and deceleration of the transducers. Thus, vibration of the actuator and the disc drive case are suppressed to achieve a significant reduction in noise generated by the disc drive during seeking. In one aspect of the invention, the limitation in control signal changes is effected directly. In this aspect of the invention, the distance remaining to the target track during movement of a transducer to that track is repetitively estimated and a profile velocity is determined from each estimated distance. A control signal, to be outputted to the actuator driver and having a component that is determined from the difference between the profile velocity and an estimate of the radial velocity of the transducers across the disc surfaces, is generated and the difference between the control signal and the control signal similarly determined for the previous distance estimate is compared to a preselected slew rate limit. For control signal differences that exceed the slew rate limit, the control signal for the current repetition of the control cycle is adjusted to the sum of the control signal for previous repetition and the slew rate limit. The adjusted control signal is then outputted to the actuator driver to determine the current passed through the actuator coil and, accordingly, the force applied to the actuator. Since changes in the control signal from one repetition of the control cycle to the next are limited to the slew rate limit, changes in the applied force are correspondingly limited to minimize vibration of the actuator and disc drive case that can generate noise.

In a second aspect of the invention, a control signal is repetitively generated as described above but is not initially outputted to the actuator driver. Rather, the control signal determined in each control cycle repetition is averaged with the control signal determined in the previous repetition and the average control signal is outputted to the actuator driver during approximately the first half of the control cycle repetition time. Subsequently, the control signal determined for the current control cycle is outputted during the remainder of the cycle time. Thus, changes in the control signal from one repetition of the control cycle to the next are outputted in steps to limit changes in successive control signals received by the actuator driver to, in turn, limit changes in the electrical current passed though the actuator coil and, consequently, changes in force applied to the actuator to effect a seek.

In a third aspect of the invention, the transducers are caused to undergo a constant velocity stage of motion between the acceleration stage with which the seek phase of transducer movement begins and the deceleration stage with which the phase ends. To this end, the distance from the initial track being followed at the time the seek phase is initiated and the target track is initially multiplied by a factor to determine a deceleration length over which the transducers are to be decelerated toward the target track in latter portions of the seek phase. Subsequently, during the execution of the seek phase, the distance that is used to determine the profile velocity to be compared to the radial velocity of the transducers in the generation of the control signal in each control cycle is selected to be the lesser of the distance remaining to the target track and the deceleration distance. Thus, the seek phase is carried out using an effective velocity profile having a limited maximum profile velocity. The factor is selected to insure that the transducers will achieve this limited maximum profile velocity with the result that sharp changes in the control signal, corresponding to direct transition from acceleration of the transducers to deceleration, is eliminated during the seek phase. Thus, the maximum rates of change of the control signal and, consequently, the forces applied to the actuator are limited to rates of change that occur in transitions from acceleration of the transducers to constant speed motion and, subsequently, from constant speed motion to deceleration of the transducers to again achieve a limitation of noise generated during the seek phase.

A fourth aspect of the invention is the combination of the three aspects that have been described above. More particularly, the profile velocity is determined from the lesser of the distance remaining to the target track and the deceleration distance and used to generate a control signal in each control cycle. This control signal is then slew rate limited as described above and the stew rate limited control signal is averaged with the slew rate limited control signal for the previous control cycle. Subsequently, the averaged control signal is outputted to the actuator driver for approximately half the control cycle repetition time and then followed with the newly determined slew rate limited control signal for the remainder of the repetition time.

An additional benefit of the present invention, arising from the limitation of vibration of the actuator in minimizing noise generated during transducer movements, is that the invention can reduce the time required for the movement to take place. As noted above, the transducers are supported on the ends of flexures mounted on the actuator so that the vibration of the actuator, including the flexures, must be damped after a transducer has reached a target track before retrieval of a previously stored file or writing a new file can be commenced. By limiting vibration of the actuator, the damping time can be reduced to enable transfer of a file to or from a data track to be commenced at the earliest possible moment after the transducer movement has been completed.

An important object of the present invention is to minimize noise that is generated by applied forces used to effect movement of transducers between tracks in the operation of a disc drive.

Another object of the invention is to effect such minimization in a manner that is readily implemented in substantially any disc drive.

Yet a further object of the invention is to minimize the time required for settling of a disc drive transducer on a target track following movement of the transducer to the target track.

Other objects, features and advantages of the present invention will become apparent from the following detailed description when read in conjunction with the drawings and appended claims.

BRIEF DESCRIPTION OF THE DRAWINGS

FIG. 6 is a graph of actuator current as a function of time during movement of transducers in accordance with the first preferred embodiment of the present invention.

FIG. 8 is a flow chart of a servo microprocessor routine carried out in the practice of the second embodiment of the present invention.

DESCRIPTION OF THE DISC DRIVE

Figure 1:
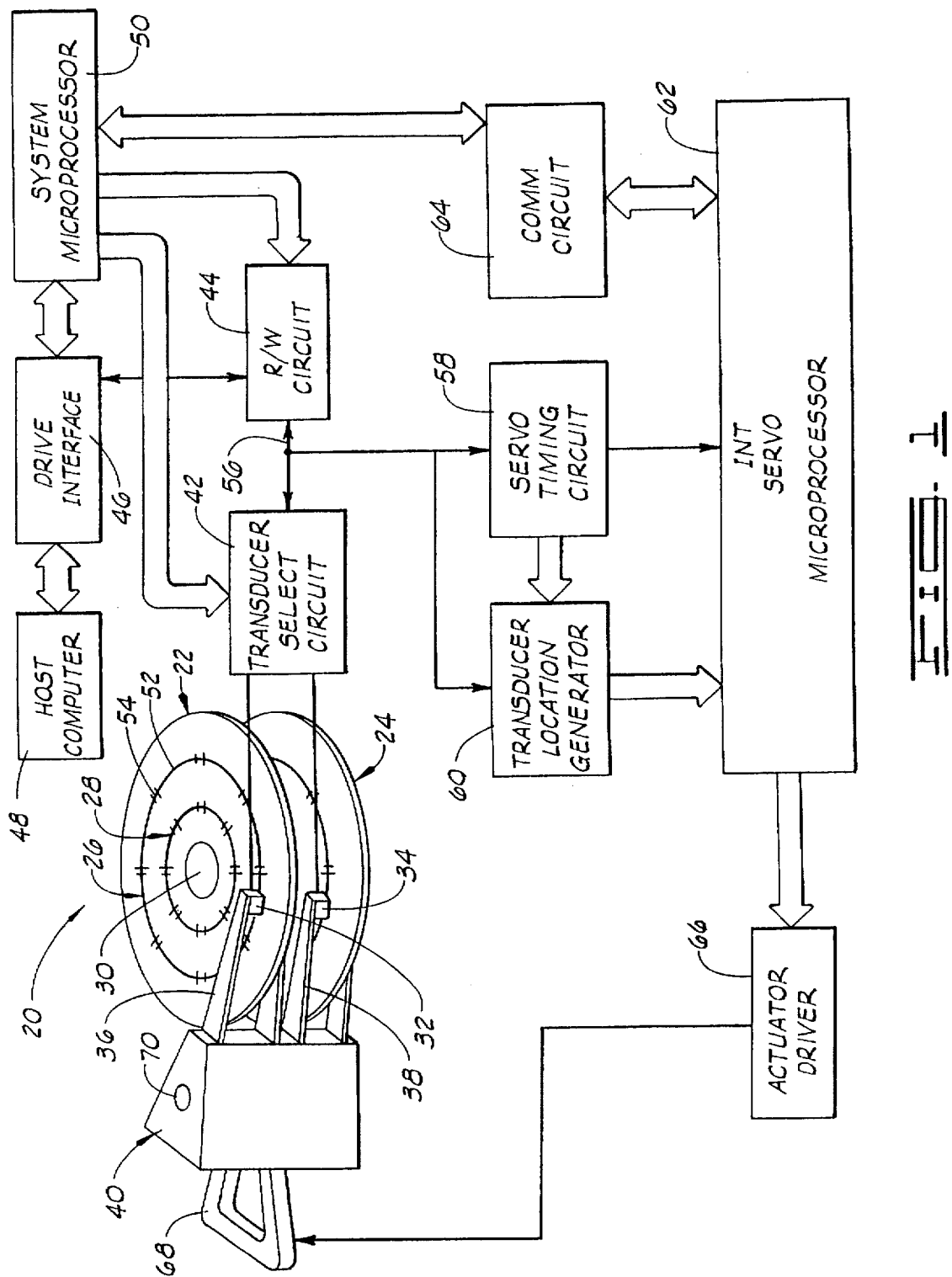
FIG. 1 is a schematic representation of a disc drive in which the method of the present invention may be advantageously carried out.

In order to provide a basis for describing the method of the present invention, it will be useful to briefly describe a disc drive in which the invention might be practiced. FIG. 1, which illustrates typical features of a disc drive, designated by the general reference numeral 20 in such figure, that employs an embedded servo system to control the movement and positioning of transducers used to store and retrieve user files, has been included for this purpose.

While the invention will be discussed in the context of a disc drive that employs an embedded servo system, it will be clear to those of skill in the art that the practice of the inventive method is not limited to the particular type of servo system that might be included in a disc drive. For example, the inventive method might also be practiced in a disc drive having a servo system that includes a dedicated servo surface and a servo transducer to control the movement and positioning of read/write transducers as described in U.S. Pat. No. 5,262,907 issued Nov. 16, 1993 to Duffy et al. the teachings of which are hereby incorporated by reference. Thus, the description of a particular disc drive has been included herein in the spirit of providing a concrete example that will facilitate an understanding of the invention and is not intended to imply any limitation with respect to the disc drive in which the invention might be advantageously employed.

Referring to FIG. 1, the disc drive 20 is comprised of a plurality of discs, two of which have been illustrated and designated by the reference numerals 22 and 24 in the drawing, that are provided with magnetizable surface coatings so that computer files can be stored in the disc drive in the form of patterns of magnetization of concentric data tracks defined on the disc surfaces. Two such data tracks, 26 and 28, have been illustrated on the upper surface of the disc 22. The discs 22, 24 are mounted on a spindle 30 for rotation about the centers of the data tracks and the disc drive is further comprised of a plurality of read/write transducers, such as the transducers 32 and 34 in FIG. 1, that are supported adjacent the disc surfaces on the ends of flexures, such as the flexures 36 and 38 in FIG. 1, that are mounted on an electromechanical actuator 40 that can be pivoted to align a selected transducer with a data track that is to store a computer file or from which a previously stored file is to be retrieved.

As is conventional, the disc drive 20 is comprised of a transducer select circuit 42 that is electrically connected to all of the transducers and provides two way communication between the selected transducer and a read/write circuit 44 that in turn communicates with a drive interface 46 that includes a buffer (not shown) that provides temporary storage tier files received from a host computer 48 for writing to a selected data track or from a data track for transmission to the host computer 48. The operation of the drive interface 46, the read/write circuit 44 and the transducer select circuit 42 are controlled by a system microprocessor 50 which orchestrates the various operations of the disc drive 20 necessary to store or retrieve a file.

In a disc drive that employs an embedded servo system (not generally designated in the drawings) the data tracks are organized into a series of data sectors 52, one of which has been indicated on the data track 26, that are separated by servo sectors 54 to which servo patterns, that can be read by a transducer to provide an indication of the radial location of the transducer on the adjacent surface, are written at the time the disc drive is manufactured. In general, the servo sectors include an address field that is magnetized in a pattern that identifies the data track that includes the servo sector and a position field that can be read by a transducer to determine the location of the transducer with respect to that track. Typical formats for the address and position fields have been described in the aforementioned U.S. Pat. No. 5,262,907 and need not be described herein for purposes of the present disclosure.

In order to control movement of the transducers between tracks and positioning of the transducers with respect to a selected track, the disc drive is further comprised of a servo system (not generally designated in the drawings) which, in an embedded system, receives signals from the transducer that is selected to read or write a file, by tapping the signal path 56 between the transducer select circuit 42 and the read/write circuit 44. The servo system typically includes a servo timing circuit 58, that employs a phase locked loop (not shown) and a counter (not shown) to generate clock signals, synchronized with the passage of the servo sectors, that are transmitted to a transducer location generator 60 to control the operation of circuitry in the transducer location generator 60 that detects signals induced in a transducer selected by the head select circuit 42 as the address and position fields of a servo sector pass the transducer and stores the address of the data track that includes the servo sector and the location of the selected transducer with respect to that data track.

Often, and as shown in FIG. 1, the servo system will further include a servo microprocessor 62 that is provided to control movements and positioning of the transducers and, in such case, it is common practice for the servo timing circuit 58 to interrupt the servo microprocessor 62 each time a servo sector passes the selected transducer so that the servo microprocessor 62 can read the address and transducer location stored in the transducer location generator 60 and generate a control signal that is appropriate to the present mode of operation, track following or track accessing, of the disc drive 20. Alternatively, the control signals can be generated the system microprocessor 50. Where a disc drive includes a servo microprocessor 62, the mode of operation of the disc drive and, consequently, the control signals that are generated by the servo microprocessor 62, are determined by the system microprocessor 50 which issues commands to the servo microprocessor 62 via a communication circuit 64 that provides for bidirectional flow of information between the microprocessors 50 and 62.

Control signals generated by the servo microprocessor 62 are transmitted to an actuator driver that passes an electrical current through a coil 68 mounted on the end of the actuator 40 in relation to the control signal received by the actuator driver 66. Generally, the current passed through the coil 68 is proportional to the control signal up to the maximum current the actuator driver can provide and is such maximum for larger control signals. The coil 68 is immersed in a magnetic field provided by a permanent magnet assembly (not show) so that the current passed through the coil will give rise to a force on the coil 68 that exerts a torque on the actuator 40 about a spindle 70 whereon the actuator 40 is mounted. Thus, the transducers can be accelerated radially across the discs in proportion to the control signals that are generated by the servo microprocessor 62 to maintain alignment of a selected transducer with a selected data track or to move a transducer across the adjacent disc surface to access a selected data track.

Description of the Velocity Profile

As has been noted above, a velocity control approach is generally used to access a selected data track, a target track, that is to store a file or from which a file is to be retrieved. In this approach, control signals are repetitively generated by the servo microprocessor during a seek phase of the movement of the transducer adjacent the disc surface that contains the target track to cause the transducer to be accelerated to a velocity profile and thereafter to substantially follow the velocity profile as the transducer approaches the target track. A typical velocity profile has been illustrated in FIG. 2 and the features of such profile will now be described to provide a basis for discussion of the present invention.

Figures 2, 3:
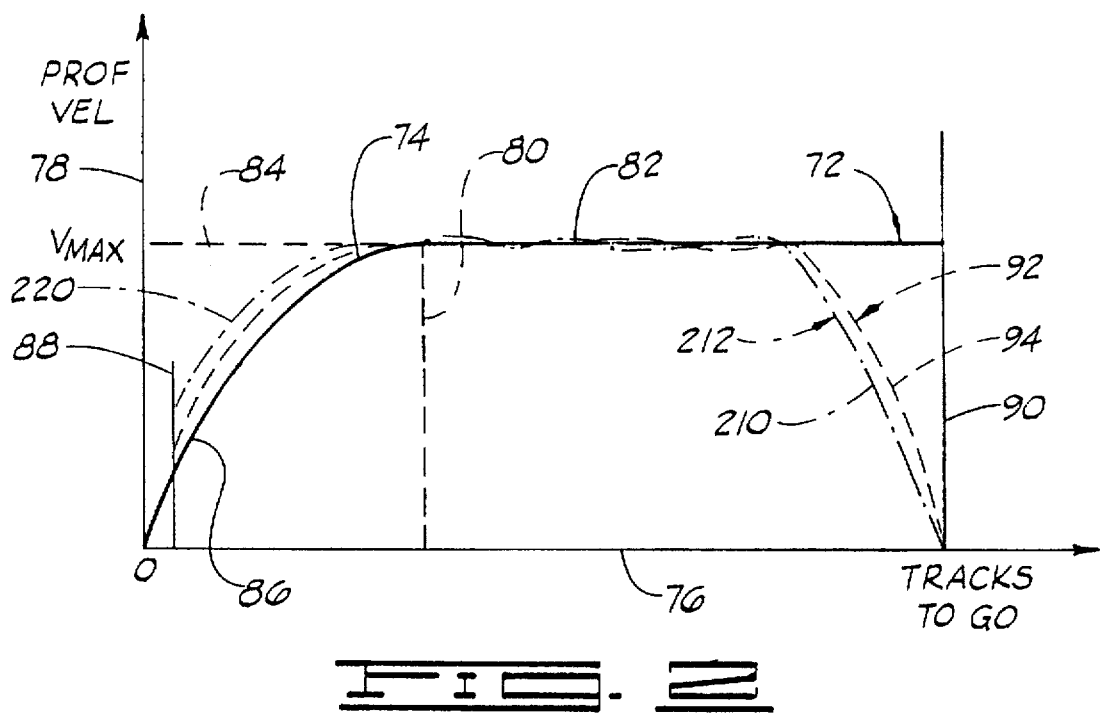
FIG. 2 is a graph of a typical velocity profile used in carrying out the seek phase of transducer movement in a disc drive illustrating the movement of the transducers in accordance with one preferred embodiment of the invention.
FIG. 3 is a flow chart of the system microprocessor program used in the practice of the preferred embodiment of the invention illustrated in FIG. 2.

As shown in FIG. 2, the velocity profile is a relationship between a profile velocity and the distance, often referred to as the number of "tracks to go", between a selected transducer and a target track to be accessed while movement to the target track takes place. Commonly, a velocity profile is selected during the manufacture of a disc drive and stored, either as a look-up table or in the form of coefficients of an equation that can be evaluated during transducer movement, in the memory of one of the microprocessors 50 or 62. (The description of the invention to be presented below contemplates that the velocity profile will be stored in the memory of the system microprocessor 50 but such storage is not a limitation on the practice of the invention. Rather, the description of the invention for the case in which the velocity profile in the system microprocessor memory has been presented in the spirit of providing a concrete example which will facilitate an understanding of the present invention.)

Conventionally, the velocity profile 72 includes two portions, a deceleration portion 74 which decreases from a maximum velocity, indicated at 84 in FIG. 2, as the number of tracks to go, plotted along the axis 76 in FIG. 2, decreases to zero; that is, as the distance between the selected transducer and the target track, represented by the profile velocity axis 78 in FIG. 2 decreases to zero. The deceleration portion of the profile velocity extends to a maximum distance from the target track that has been indicated by the dashed line 80 in FIG. 2 and the profile 72 further includes a constant velocity portion 82 for which the profile velocity is the maximum velocity 84. The manner in which the velocity profile is often developed is to determine the distance required to bring a transducer to rest from any velocity up to the maximum velocity assuming a constant deceleration of the transducer as it nears the target track. The velocities used to make the determinations are then stored, as described above, in relation to the calculated distances. The velocity profile may also include a linear portion as has been indicated at 86 in FIG. 2.

While, as noted above, the practice of the present invention includes the use of a velocity profile, the inventive method is not limited to a particular form of the profile. Rather, the form shown in FIG. 2 has been presented to bring out general features of the profile in order to facilitate the description of the preferred practice of the invention to be presented below. A further feature of FIG. 2 that is of interest is a minimum distance 88 at which the seek phase of the movement of the transducer to the target track ends and settling of the transducer on the target track is commenced using control routines that are not pertinent to the present invention.

Before proceeding to the present invention, it will be useful to note a further point concerning the development of the velocity profile that is of relevance to the present invention and, further, to briefly describe one mechanism that gives rise to excessive noise during seeks that are carried out in accordance with conventional methods.

Electrical power for the operation of a disc drive is provided by the host computer 48, usually at a nominal voltage of 12 volts dc, and such power is supplied to the actuator driver 66 to permit the actuator driver 66 to pass a current through the actuator coil. However, the power supplied to the actuator driver is not unlimited with the result that the actuator driver will generally saturate to supply a maximum current that can vary not only from one disc drive to another but from time to time. Since the torque exerted on the actuator is proportional to the current passed through the actuator coil, the torque is limited by the maximum current available under existing conditions to limit the maximum rate at which the transducers can decelerate radially across the disc surfaces. Accordingly, it is common practice in the development of a velocity profile to determine the portion 74 using a maximum rate of deceleration that the transducers can achieve using the maximum current that can be supplied to the actuator coil under any conditions in which the disc drive might be operated to insure that the movement of a transducer can be terminated at the target track. The relevance of this point will become clear below.

One mechanism that gives rise to excessive noise in the movement of a transducer from an initial track, indicated by the line 90 in FIG. 2, in conventional seek methods is an excessively rapid acceleration of the transducer when the seek begins. Conventionally, the seek is carried out by estimating the velocity of the transducers from measurements of the transducer location in successive interrupts of the servo microprocessor, determining the profile velocity from the current location of the transducer and the target track and determining the control signal that is outputted to the actuator driver in each interrupt in proportion to the difference between the estimated and profile velocities. The result of such control has been illustrated by the dashed line 92 in FIG. 2 which illustrates the velocity of the transducers as a function of distance remaining to the target track using conventional seek methods. At the time the seek phase commences, the transducers will be substantially at rest in radial alignment with the initial track so that the difference between the estimated and profile velocities is substantially the maximum velocity used to develop the velocity profile. Consequently, the control signal will be large during initial stages of the transducer movement to cause a large electrical current, often the maximum the actuator can supply, through the actuator coil 68. As a result, an initial, large force is applied to the actuator 40 at the outset of the movement of the transducers to give rise to an initial large acceleration of the transducers from the initial track that has been indicated by the portion 94 of the curve 92. This sudden application of a large force to the actuator 40 is equivalent to a blow delivered to the actuator 68 by the magnets (not shown) that provide the magnetic field in which the actuator coil 68 is immersed and a reactive blow to the magnets. This blow can set up resonant vibrations in the actuator 40 and the disc drive case which supports both the actuator and the magnets to produce readily audible noise from the disc drive. In one embodiment of the invention, now to be discussed with respect to FIGS. 3 through 6, changes in the control signal that is outputted to the actuator driver 66 in successive interrupts of the servo microprocessor are limited to effect a corresponding limitation in changes in the forces that can be experienced by the actuator in successive time intervals that correspond to the interrupts.

Description of the First Embodiment

To facilitate an understanding of the invention, it will be useful, prior to describing the inventive method in detail to present a brief overview of a servo control approach that can be advantageously exploited in the practice of the invention and which is contemplated in the flow charts by means of which the inventive method will be described below. Such approach is a state-space design approach using a full order estimator to estimate, in each repetition of an interrupt program in which control signals are generated by the servo microprocessor 62 and outputted to the actuator driver 66, the position and velocity of the transducers at the beginning of next interrupt of the servo microprocessor. Additionally, bias forces that are exerted on the actuator; for example, forces on the transducers arising from air swirled by the discs, are estimated in each interrupt and are used to generate a component of the control signal that is added to a component derived from the velocity profile in a manner that will be described below.

In this approach, the transducer location information inputted by the servo microprocessor 62 in each interrupt is compared to the estimated position for that interrupt to update the position, velocity and bias estimates. Additionally, the comparison is utilized to derive a third component of the control signal that compensates for variations between the locations of the transducers, as determined by reading the address and position fields of the servo sector that passes a selected transducer before each interrupt, and the position of the transducers that is estimated for each interrupt. Thus, throughout the seek phase, the bias forces exerted on the actuator will be fully compensated so that the settle phase, and subsequent track following by the transducers, will commence with control signals that include the effect of the bias forces. Consequently, the transducers will be rapidly settled on the target track without an offset that can arise from the bias forces to permit early initiation of reading a file from the target track or writing a file to the target track.

As has been noted above, the velocity profile that is used in the generation of control signals during the seek phase of movement is preferably stored in the system microprocessor 50. Such storage, coupled with the estimation, in each interrupt, of the transducer location for the next interrupt, permits early determination of the profile velocity to expedite the generation of the control signal to be outputted to the actuator driver 66 in each interrupt that will minimize processing time between the determination of parameters utilized to determine the control signal in each interrupt of the servo microprocessor and the output of the control signal to the actuator driver. Consequently, control signals outputted to the actuator driver will reflect substantially the state of the servo system at the time the interrupt of the servo microprocessor 62 occurs to maintain accurate control over the movement of the transducers throughout the seek phase that will facilitate rapid settling of the transducers on the target track at the termination of the seek phase.

Referring now to FIGS. 3, 4, 5A and 5B, shown therein are a flow chart of a system microprocessor program utilized in carrying out a seek in accordance with the present invention, a flow chart of an interrupt routine that is executed by the servo microprocessor 62 immediately preceding the commencement of the seek phase of movement of a selected transducers to a selected track and a flow chart of an interrupt routine that is repetitively executed by the servo microprocessor 62 during the seek phase of movement of the transducer to the target track. These flow charts will be described in turn.

Referring first to FIG. 3, movement of a selected transducer to a selected data track on the disc surface adjacent the selected transducer is initiated by the host computer via a command outputted to the drive interface 46 along with the identification of the transducer that is to be used to read or write a file at the termination of the movement of the transducers and the address of the data track to which the file is to be stored or from which a file is to be retrieved. In response to the command from the host computer, the system microprocessor 50 will read the transducer selection, step 96, and target track location, step 98, from the drive interface 46 and determine the distance, referred to herein as the seek distance, from the track currently being followed to the target track as indicated at step 100.

In some cases, the seek distance will be less than or equal to the minimum distance 88 at which settling is initiated in longer movements of the transducers and, in such case, the seek phase of the movement need not be carried out. Rather, the movement of the transducers can be effected using the settle routine that follows the seek phase for longer movements of the transducers. Thus, following the determination of the seek distance, the seek distance is compared to the minimum distance 88 (see FIG. 2) of the velocity profile, step 102, and, if the seek distance does not exceed such minimum distance, the system microprocessor exits to the settle routine at step 104. The settle routine, which may be any conventional settle routine, is not germane to the present invention and need not be further discussed for purposes of the present disclosure.

If the seek length exceeds the minimum distance 88 for which settling is to be effected, the seek distance is selected as a profile distance, step 106, to be used to determine a profile velocity, step 108, using the velocity profile that is stored in the memory of the system microprocessor 50 as has been described above; that is, by using the profile distance to look up the profile velocity or by evaluating a function, which expresses the profile velocity, at the profile distance. This profile velocity is outputted to a latch in the communications circuit 64, step 110, to be read by the servo microprocessor 62 and used to generate a control signal to be outputted to the actuator driver 66 as will be described below. It will be noted that, since the profile distance determined at step 106 is the seek distance, the profile velocity determined at step 108 can be any velocity up to the maximum velocity 84 used to generate the velocity profile 72. Accordingly, since the seek begins with the transducers following an initial track with a radial velocity of zero, determination of the control signal in direct proportion to the difference between the profile velocity and the radial velocity of the transducers in the conventional manner would often lead to the generation of a large amount of acoustic noise as movement of the transducers commences.

Following output of the profile velocity, the target track address and a seek command are outputted to latches in the communications circuit 64, at steps 114 and 116 respectively, and a code that identifies the selected transducer is outputted, step 118, to the transducer select circuit 42 to cause signals appearing on the signal path 56 and transmitted to the transducer location generator 60 and the servo timing circuit 58 to be signals induced in the selected transducer by movement of data tracks on the surface that contains the selected data track by the selected transducer. The system microprocessor then sets a command flag, step 120, in the communications circuit 64 and enters a loop in which the system microprocessor 50 repetitively determines profile velocities as the seek phase of the transducer movement proceeds. More particularly, the system microprocessor 50 repetitively polls a latch in the communications circuit 64 to determine whether a system flag has been set by the servo microprocessor 62, as indicated by the decision block 122.

When the system flag is set, the system microprocessor 50 inputs, at step 124, the contents of a latch in the communications circuit 64 that, as will be discussed below, will contain the number of tracks to go to the target track from the location of the selected transducer at the beginning of an interrupt of the servo microprocessor and resets the system flag, step 126. The number of tracks to go to the target track is compared, step 128, to the minimum distance 88 of FIG. 2 at which settle is to be commenced and, if the number of tracks to go is less than or equal to the minimum distance 88, the system microprocessor 50 exits to the settle routine 104. If not, the number of tracks to go is selected as a new profile distance, step 130, and the profile velocity for this distance is determined, step 132, from the stored velocity profile, and outputted to a latch in the communications circuit 64 at step 134. The system microprocessor then returns to polling the communications circuit 64 to determine whether the system flag has been set. Thus, the system microprocessor 50 will repetitively execute a portion of a control cycle which, as will be discussed below, leads to the generation of a control signal by the servo microprocessor 62 in each interrupt of the servo microprocessor 62 and transmittal of the control signal to the actuator driver 66 so long as the selected transducer is located a number of tracks from the target track that exceeds the minimum distance for which settle of the selected transducer on the selected track is to commence.

Figure 3:
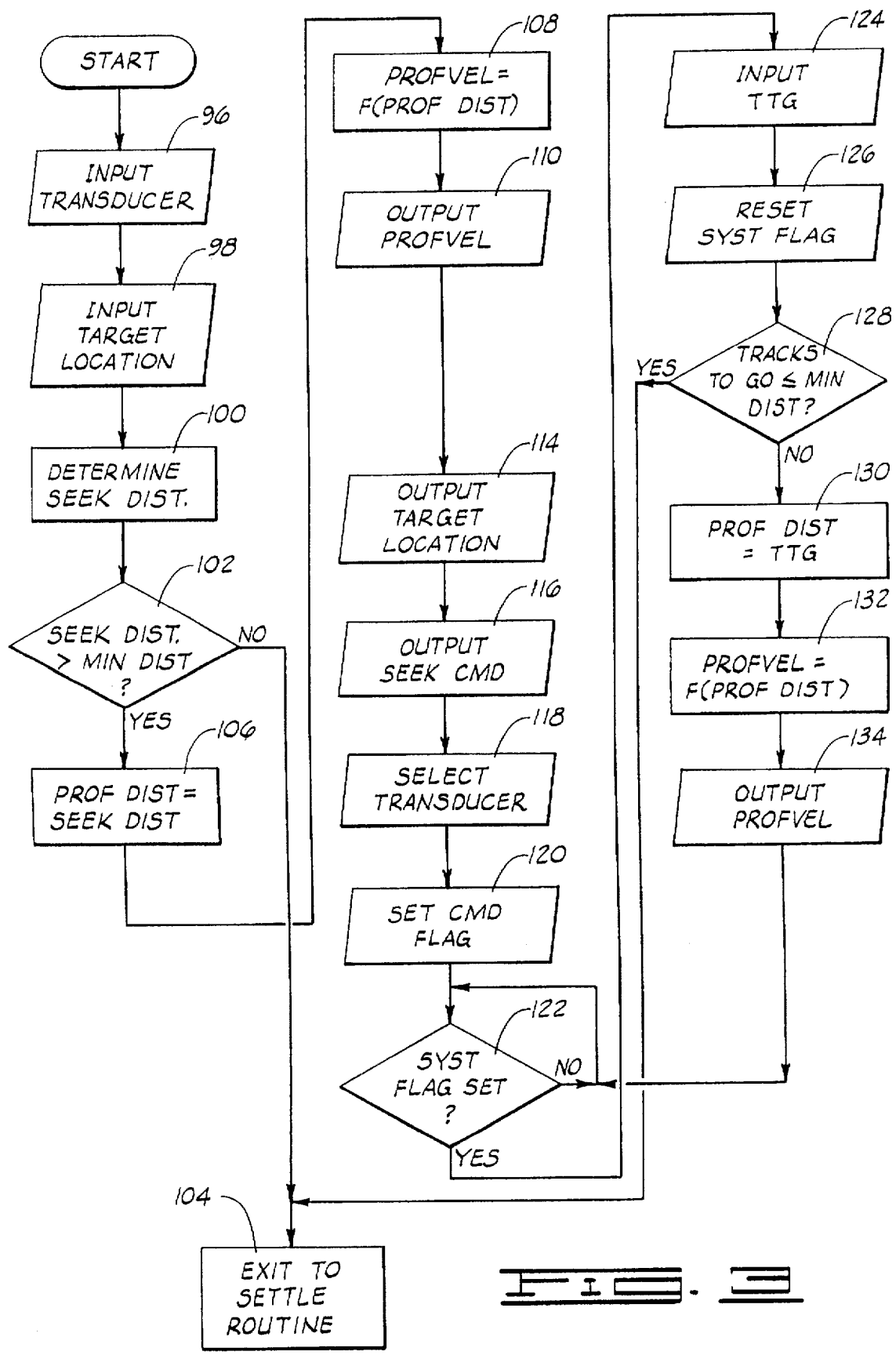
Figures 3, 4:
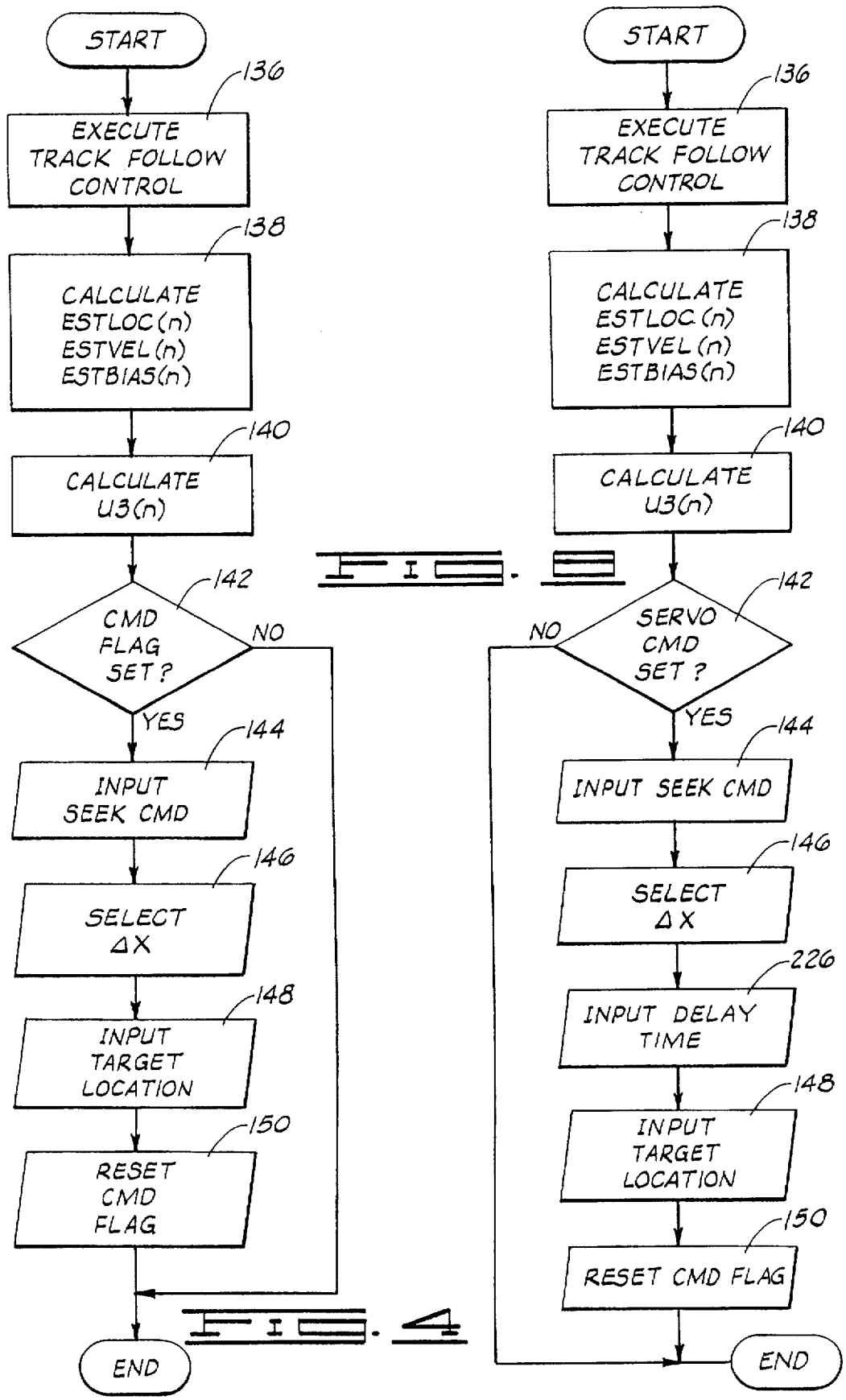
FIG. 4 is a flow chart of a servo microprocessor routine used in the practice of a first preferred embodiment of the present invention.

Referring to FIG. 4, shown therein is a flow chart of a servo microprocessor 62 interrupt routine that is executed by the servo microprocessor 62 in the interrupt that follows issuance of the seek command by the system microprocessor at step 116 of FIG. 3. In the interrupt routine illustrated in FIG. 4, the servo microprocessor 62 will initially execute a track follow control subroutine, step 136, in which a control signal is generated using previously estimated state variables, determined in the previous interrupt as has been described above, and outputted to the actuator driver 66. In response to the control signal, the actuator driver 66 will pass a current through the actuator coil to apply forces to the actuator 40 that will correct deviations of a previously selected transducer from a previously selected data track. The track following control subroutine, which is conventional, is not germane to the present invention and need not be further considered for purposes of the present disclosure.

Following execution of track follow control subroutine, the state of the servo system at the beginning of the next interrupt, indicated by the index n, at which the movement of the selected transducer to the target track commences, is estimated, step 138, and a third component of the control signal that will be used in the control signal outputted to the actuator driver in the next, or nth, interrupt is predetermined at step 140. (The estimation of the state of the system at the beginning of the next interrupt utilizes information that is obtained during the track follow subroutine as well as in initial stages of the routines that are followed during the seek phase of the movement of the selected transducer to the target track. Accordingly, it will be useful to consider the manner in which the state estimation is effected and the manner in which the third component of the control signal is generated in the discussion of interrupts utilized in effecting transducer movements to follow.) Once the state estimation and third control signal component calculation steps have been completed, the servo microprocessor checks the communication circuit 64 to determine whether the command flag has been set, step 142, and, if not, the interrupt of the servo microprocessor 62 ends. In such case, a new track follow subroutine will be carried out in the next interrupt. Thus, in general, the servo microprocessor 62 will repetitively execute track following between commands received from the system microprocessor 50 to execute movement of a newly selected transducer to a newly selected data track on the disc surface adjacent the selected transducer.

In the interrupt of the servo microprocessor 62 following the issuance of a seek command by the system microprocessor 50, the command flag will be set and the servo microprocessor 62 inputs, at step 144, the command that has been previously entered in the communication circuit 64 by the system microprocessor 50; that is, the seek command that has been outputted at step 116 of FIG. 2. In response to the seek command, the servo microprocessor selects, at step 146, a transducer location validation parameter, $\Delta x$, to be discussed below and the address of the target track to initialize a routine that will be repetitively executed in successive interrupts to effect the seek phase of movement of the selected transducer to the target track. Following input of the target track address, the command flag is reset, step 150, and the interrupt ends.

Figure 5A:
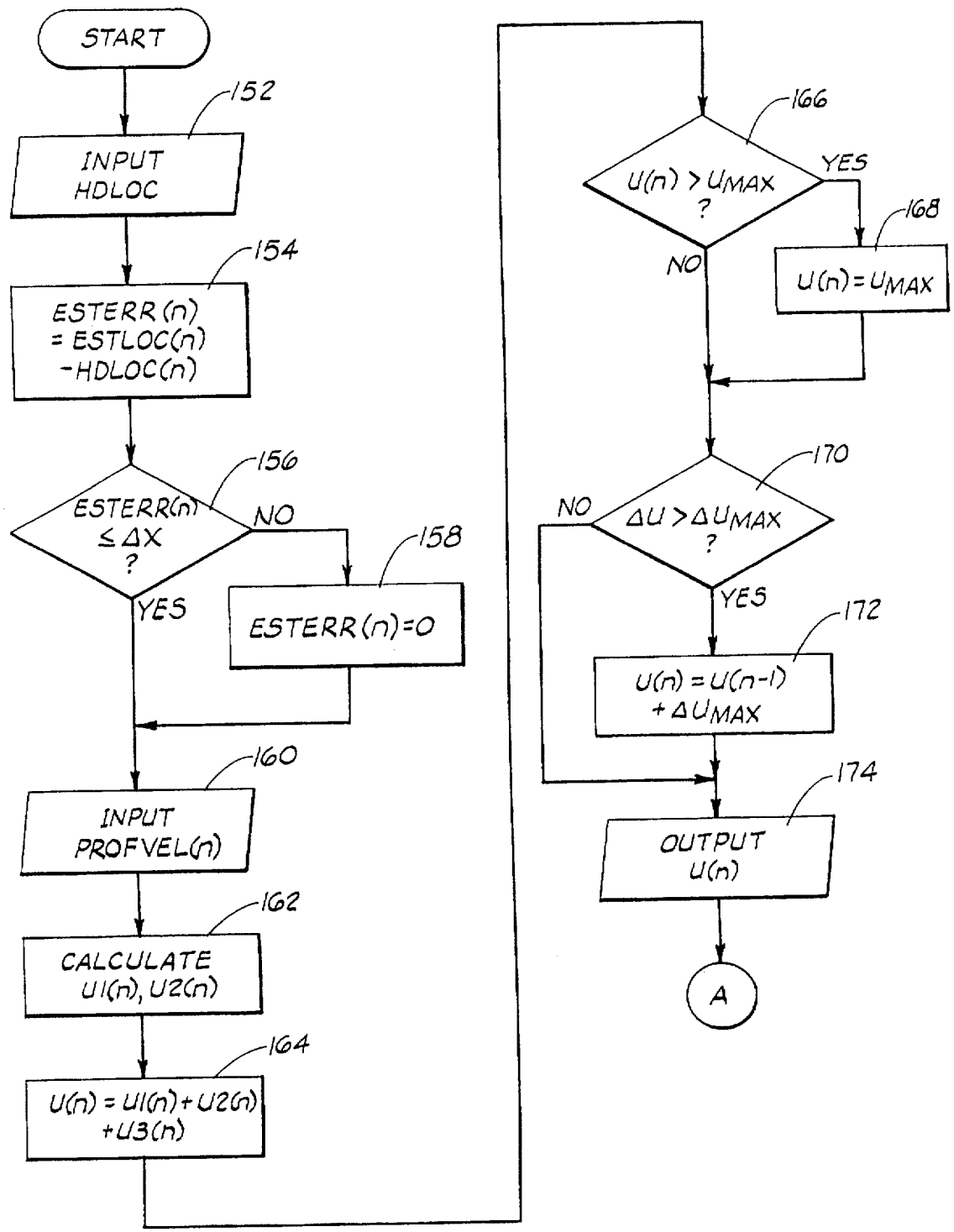
FIGS. 5A and 5B are flow charts of servo microprocessor routines repetitively carried out in the practice of the first preferred embodiment of the invention.
Figure 5B:
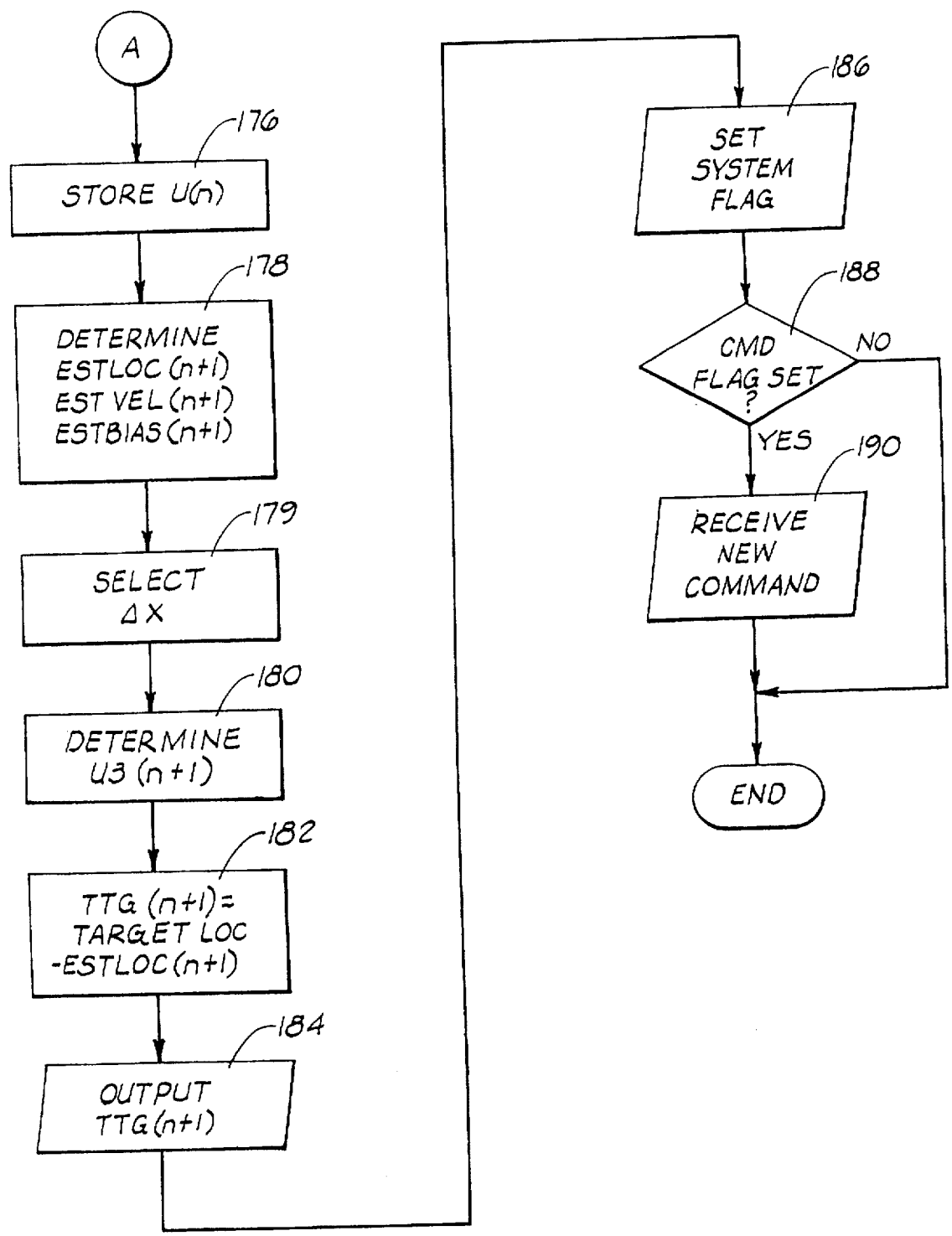

Referring now to FIG. 5A and 5B, shown therein is a flow chart of a servo microprocessor routine that is repetitively executed, once in each interrupt of the servo microprocessor 62, from the commencement of the seek phase of movement of the selected transducer to the target track until the system microprocessor 50 issues a new command to the servo microprocessor 62 when the system microprocessor 50 exits to the settle routine. Following passage of a servo sector 54 by the selected transducer, the servo microprocessor is interrupted by the servo timing circuit 58 as has been described above and, in the initial step of the interrupt routine during the seek phase, step 152 in FIG. 5A, inputs the location of the selected transducer with respect to the data tracks on the disc surface adjacent the selected transducer from the transducer location generator 60. Such location, indicated as HDLOC(n) in FIG. 5A, is comprised of the track address and transducer head location that are stored in the transducer location generator 60 during passage of the servo sector preceding the interrupt as described above. Thus, HDLOC(n) will be comprised of the address of the data track nearest the selected transducer at the time the interrupt is issued to the servo microprocessor 62 and the distance between the selected transducer and such data track.

In general, the transducer location inputted at step 152 will differ from the location of the selected transducer for the beginning of the interrupt that has been estimated in the previous interrupt and the difference is calculated, step 154, as an estimation error, ESTERR(n), that will be utilized in the generation of a control signal and the estimation of the state of the servo system at the beginning of the next, or (n+1)st, interrupt as will be described below. Following the calculation of the estimation error, the transducer location, HDLOC(n), inputted at step 152 is validated by determining whether ESTERR(n) is less than the transducer validation parameter as indicated by the decision block 156 in FIG. 5A. Greater differences indicate that excessive noise has occurred in the reading of the servo sector that has passed the selected transducer immediately prior to the servo microprocessor interrupt so that use of ESTERR(n) in the generation of control signals and estimates of the state of the servo system at the beginning of the next interrupt, as will be described below, would lead to inappropriate values for the control signals and the servo system state estimates. If the estimation error ESTERR(n) is greater than the parameter $\Delta x$, ESTERR(n) is set to zero, step 158, to avoid inaccuracies in the control signals and estimates. The value of the parameter $\Delta x$ is selected on the basis of the estimated velocity for the next interrupt to reflect velocity dependent ranges of estimation accuracy, stemming from variations in component characteristics from one disc drive to another, at the time of disc drive manufacture and stored in the memory of the servo microprocessor 62.

Following validation of the location of the selected transducer, the profile velocity, PROFVEL(n), most recently outputted to the communications circuit 64 from the system microprocessor 50 is inputted by the servo microprocessor 62, step 160, and the servo microprocessor 62 proceeds to the generation of the control signal that is to be outputted to the actuator driver 66.

In the preferred practice of the present invention, the control signal for the nth interrupt has three components, a component U1(n) determined from the profile velocity inputted at step 160 and components, U2(n) and U3(n) that are internally generated within the servo microprocessor to compensate, respectively, for differences between the estimated and measured locations of the selected transducer at the beginning of the nth interrupt and bias forces that are exerted on the actuator. However, the inventive method is not limited to the generation of control signals having all of these components. As is known in the art, the seek phase of transducer movement can be carried out without using the state-space design approach to servo control in which the servo microprocessor utilizes a full order estimator to repetitively estimate the state of the servo system at the beginning of each servo microprocessor interrupt. In such case, only the first component U1(n) would be used in the generation of control signal. Thus, discussion of the generation of the control signal to include three components is presented in the spirit of providing a complete description of the best mode of practicing the present invention but is not limiting on such practice.

Following the input of the profile velocity at step 160, the components U1(n) and U2(n) are calculated, step 162, in accordance with the relations:

$$U1(n)=A1\ [PROFVEL(n)-ESTVEL(n)] \quad (1)$$

and $$U2(n)=A2\ ESTERR(n) \quad (2)$$

where ESTVEL(n) is the estimated radial velocity of the selected transducer at the beginning of the nth interrupt. Such estimate will be the velocity estimated in the previous interrupt using the state-space design control approach where such approach is used. Where the state-space design approach is not used, the velocity ESTVEL(n) is obtained from successive measurements of the location of the selected transducer in a conventional manner.

Returning to FIG. 4, the component of the control signal U3(n), calculated at step 140 of the (n−1) interrupt for use in the nth interrupt is calculated in accordance with the relation:

$$U3(n)=A3\ ESTBIAS(n) \quad (3)$$

where ESTBIAS(n) is the bias force, estimated at step 138 of the (n−1)st interrupt, that will be experienced by the actuator 40 at the beginning of the nth interrupt. As is known in the art, the constants in these equations will generally vary from one disc drive to another and can be determined for a particular disc drive at the time of manufacture using standard servo plant modeling techniques.

Once the components of the control signal have been determined, they are added, step 164, to provide a control signal which, after adjustment, is outputted to the actuator driver 66. Additionally, prior to adjustment, the control signal may be limited to a maximum value Umax, that is selected to prevent the actuator driver 66 from passing the maximum electrical current which it can supply through the actuator coil 68. As will be clear to those of skill in the art, such limitation will cause the current that is passed through the actuator coil 68 to give rise to forces that are used to carry out the seek phase of movement of the transducers to be proportional to the control signal that, after further adjustment, will be outputted to the actuator driver 66. Thus, the control signal that is outputted to the actuator driver will provide a measure of the force on the actuator for a purpose that will be described below. The limitation of the control signal to Umax is effected by comparing the control signal determined at step 164 to the maximum control signal Umax, step 166, and, at step 168, replacing the control signal calculated at step 164 with the maximum control signal Umax at such times that the calculated control signal exceeds Umax. (As will be recognized by those of skill in the art, the control signal and the maximum control signal will have signs indicative of the direction of movement of the transducers. For clarity of illustration, the signs of these quantities have been suppressed in the drawings.) Where the disc drive includes means for measuring the actuator current and inputting the actuator current to the servo microprocessor 62; for example, as described in the aforementioned U.S. Pat. No. 5,262,907, the limitation on the maximum control signal that can be outputted to the actuator driver 66 provided by the steps 166 and 168 can be omitted and the current through the actuator coil 68 can be used as a measure of the force on the actuator 40 in steps discussed below.

In accordance with the first aspect of the present invention, the control signal that is outputted to the actuator driver 66 is adjusted, either with or without the limitation provided by steps 166 and 168 as is appropriate, to prevent large changes in the control signal from one interrupt to the next that will give rise to noise during the seek phase of transducer movement. To this end, the difference $$\Delta U = U(n) - U(n-1) \quad (4)$$

between the control signal calculated at step 164 (or the limited control signal determined at step 168) and the control signal that was outputted to the actuator driver 66 in the previous interrupt is compared to a slew rate limit ΔUmax, step 170, preselected as will be described below, and if the difference exceeds the slew rate limit, the control signal is adjusted, step 172, to be the sum of the slew rate limit and the control signal outputted in the previous interrupt. (As in the case of the maximum control signal, signs have been suppressed in the steps 170 and 172 for clarity of illustration of the servo microprocessor programming.) The adjusted control signal is then outputted to the actuator driver 66 at step 174 in FIG. 5A.

Referring now to FIG. 5B, wherein the flow chart for the interrupt under discussion is continued as indicated by the connector A in FIGS. 5A and 5B, the adjusted control signal outputted to the actuator driver 66 is stored for use in the next interrupt, step 176, and the servo microprocessor 62 turns to the estimation of the state of the system at the beginning of the next interrupt of the servo microprocessor 62. In particular, in each interrupt, indicated as the nth interrupt in FIGS. 5A and 5B, the location, ESTLOC(n+1), of the selected transducer, its velocity, ESTVEL(n+1), and the bias force ESTBIAS(n+1) the actuator 40 will experience at the beginning of the next, the (n+1), interrupt are calculated, in step 178, in accordance with the relations that can be generally expressed as $$ESTLOC(n+1) = ESTLOC(n) + B1\ ESTVEL(n) + \quad (5)$$
$$B2\ ESTBIAS(n) + B3U(n) + B4\ U(n-1) + B5\ ESTERR(n)$$

$$ESTVEL(n+1) = ESTVEL(n) + B6\ ESTBIAS(n) + \quad (6)$$
$$B7\ U(n) + B8\ U(n-1) + B9\ ESTERR(n)$$

$$ESTBIAS(n+1) = ESTBIAS(n) + B10\ ESTERR(n) \quad (7)$$

where the constants are determined using standard plant modeling techniques. Before proceeding, it will be useful to briefly discuss these estimation equations. The first term cm the right hand side of equation (5) is the estimated location of the selected transducer at the beginning of the nth interrupt. The second term in equation (5) is the change in location of the selected transducer arising from the velocity of the transducer at the beginning of the present, or nth, interrupt and the next three terms are changes in location of the selected transducer arising from acceleration of the transducer during the nth interrupt. Such acceleration will be proportional to the forces exerted on the actuator as reflected by the term containing ESTBIAS(n) and the term containing the control signal U(n) that gives rise to the applied force on the actuator arising from the passage of a current through the actuator coil 68. The term containing U(n−1) has been included for generality to compensate, in the present embodiment of the invention, for computation delay.

As noted above, the steps 166 and 168 of FIG. 5A may be deleted if the disc drive 20 includes circuitry that will permit the actuator current to be measured and inputted to the servo microprocessor 62. In such case, the actuator current is inputted along with the transducer location at step 152 of FIG. 5A and the term containing U(n) in the above equations is replaced with a term that contains the actuator current.

The final term in equation (5) is a correction, determined from the estimate of the error ESTERR(n) determined at step 154, that compensates for any effects; for example, variations in the bias forces exerted on the actuator 40, that might cause the estimated location of the selected transducer at the beginning of an interrupt to vary from the measured location.

The estimated velocity ESTVEL(n+1) is similarly determined by adding terms that take the acceleration of the selected transducer during the nth interrupt into account to the estimated velocity ESTVEL(n) for the beginning of the nth interrupt along with a term that compensates for effects that might cause the estimated location of the transducer at the beginning of the nth interrupt to vary from the measured location. As in the case of the constant B4 of the location estimation equation, the constant B8 of the velocity estimation equation compensates for computation delay in the embodiment of the invention illustrated in FIGS. 3 through 5B.

The form of the bias estimation equation; that is, equation (7), is selected to update the estimated bias to take variations in the bias forces as a function of the radial location of the selected transducer into account and eliminate offsets that such forces might produce that would extend the time required to settle the selected transducer on the data track following the completion of the seek phase of the movement of the selected transducer to the target track.

Following the estimation of the state of the system at the beginning of the next, or (n+1)st, interrupt, the validation parameter Δx for the next interrupt is selected, step 179 and the third component of the control signal to be determined in the next interrupt is calculated, step 180, from the estimate of the bias forces. ESTBIAS(n+1), that will be exerted on the actuator 40 at the beginning of the next interrupt. Additionally, the number of tracks to go to the target track at the beginning of the next interrupt, TTG(n+1), is calculated, step 182, from the estimate of the location ESTLOC(n+1) that the selected transducer will have at the beginning of the next interrupt and the address of the target track. This number of tracks to go is outputted to a latch in the communications circuit 64, step 184, and the system flag in the communications circuit 64 is set, at step 186. The command flag in the communications circuit 64 is then checked, decision block 188, to determine whether the system microprocessor 50 has issued a command for the execution of a new routine in the next interrupt of the servo microprocessor 62; for example, a command for a routine that would be used in the settling of the selected transducer on the target track. If so, the new command inputted and the seek phase of the movement of the selected transducer to the target track is terminated. The interrupt then ends. If not, the interrupt ends without the reception of a new command and the seek routine illustrated in FIGS. 5A and 5B will be repeated in the next interrupt of the servo microprocessor 62.

While the servo microprocessor 62 is carrying out the final steps of the seek routine; that is, the steps 188 and 190 of FIG. 5B, the system microprocessor 50 determines the profile velocity to be inputted by the servo microprocessor 62 at step 160 of the next servo microprocessor interrupt. Returning to FIG. 3, the setting of the system flag at step 186 of the seek routine illustrated in FIG. 5B will be detected at step 122 of the system microprocessor program to signal the presence of the number of tracks to go, at the beginning of the next interrupt of the servo microprocessor 62, in the communications circuit 64. As described above, the system microprocessor inputs this number of tracks to go and determines whether the seek phase is to be terminated by an exit to the settle routine or, if the selected transducer has yet to reach the distance from the target track at which settle is to commence, determines the profile velocity that is to be used by the servo microprocessor in thre generation of the control signal to be outputted to the actuator driver 66, outputs this profile velocity and returns to polling the system flag.

FIG. 6 illustrates the manner in which the use of a slew rate limit in the determination of the control signal that is outputted to the actuator driver 66 limits noise generated during the seek phase of transducer movement and FIGS. 2 and 6 illustrate the manner in which a suitable slew rate limit can be selected for this purpose. Referring first to FIG. 6, shown therein in solid line is a graph 192 of the actuator coil current versus time during movement of the selected transducer to the target track in accordance with the present invention and, for purposes of comparison, a graph 194 of actuator coil current versus time for transducer movements made using conventional methods. (For purposes of illustration. FIG. 6 has been drawn using the convention that the actuator current will be negative for acceleration of the selected transducer toward the target track and positive for subsequent deceleration of the selected transducer. Further, FIG. 6 has been drawn for the case in which the distance between the initial track and the target track corresponds to the distance between the line 90 and the axis 78 in FIG. 2; that is, for a relatively large radial displacement of the selected transducer.)

In accordance with conventional seek methods, the control signal that is outputted to the actuator driver 66 at the start of the seek phase will be proportional to the difference between the profile velocity and the radial velocity of the selected transducer at a time for which such radial velocity is substantially zero. Thus, the to actuator coil current will quickly rise, as indicated at 196, to the maximum current the actuator driver can supply, indicated at 198 in FIG. 6, and remain at such maximum substantially throughout the acceleration of the selected transducer to the maximum velocity 84 of the velocity profile shown in FIG. 2; that is, the maximum current 198 will be supplied in each of a succession of control cycles corresponding to successive interrupts of the servo microprocessor while the velocity of the selected transducer increases in accordance with the portion 94 of the transducer velocity curve shown in FIG. 2. As the velocity of the selected transducer approaches the maximum profile velocity 84, the actuator coil current will sharply drop to zero, as indicated at 200 in FIG. 6, and the selected transducer will then enter a coast period in which the selected transducer moves at substantially the maximum profile velocity while the control signal outputted to the actuator driver in each of a succession of interrupts of the servo microprocessor is substantially zero to result in an actuator current of substantially zero as indicated by the portion 202 of the curve 194 in FIG. 6. When the selected transducer reaches the distance indicated by the line 80 in FIG. 2 at which deceleration is to commence, the control signal will increase to the value determined by the deceleration of the selected transducer used to generate the portion 74 of the velocity profile 72 so that the actuator current will undergo a sharp increase 204 to the maximum deceleration current selected for the velocity profile and will remain at such current until the distance 88 in FIG. 2, indicated by the line 208 in FIG. 6, at which settle is to be commenced is reached. Thereafter, the actuator coil current is decreased to zero as the selected transducer is settled on the target track. Since the force exerted on the actuator coil by the magnetic field in which the coil is immersed, and the reaction force on the magnets which provide the magnetic field, is proportional to the actuator coil current, the forces that are applied to the actuator to effect the movement of the selected transducer to the target track will undergo sharp changes that correspond to the sharp changes in the actuator coil current indicated at 196, 200 and 204 in FIG. 6. These sharp changes in the force applied to the actuator coil can excite resonances in the actuator and the disc drive case to give rise to acoustic noise during movement of the selected transducer to the target track.

The use of a slew rate limit in accordance with the present invention prevents the sharp changes in the actuator coil current from occurring. More particularly, during acceleration of the selected transducer to the maximum profile velocity, as indicated by the portion 210 of a velocity curve 212 in FIG. 2 for movement of the selected transducer in accordance with the present invention, the control signal outputted to the actuator driver 66 in each interrupt of the servo microprocessor 62 is limited to the sum of the previous control signal and the slew rate limit. Thus, the actuator coil current will be increased at a substantially constant rate, as indicated at 214 in FIG. 6 until the maximum actuator coil current is reached. Such current will be maintained until the velocity of the selected transducer approaches the maximum profile velocity 84 along the portion 210 of the curve 212 in FIG. 2.

As the selected transducer approaches the maximum profile velocity, the difference between the profile velocity and the radial velocity in equation (1) will rapidly drop so that the selected transducer will again go into a coasting phase during which the transducer velocity is substantially the maximum profile velocity and the actuator coil current is substantially zero. However, because of the limitation of changes in the control signal provided by the slew rate limit, the transition from acceleration to coasting will take place over a plurality of interrupts of the servo microprocessor in which the control signal outputted to the actuator driver and, consequently, the current passed through the actuator coil is slowly reduced to zero as indicated by the portion 216 of the curve 192 in FIG. 6. When the distance between the selected transducer and the target track reaches the maximum distance 80 at which deceleration is to be commenced, the actuator current will similarly undergo an increase, 218, having a time rate of change which is limited by the slew rate limit imposed on the control signal that is outputted to the actuator driver 66. Thus, sharp changes in the current supplied to the actuator coil 68 by the actuator driver 66, and consequent sharp changes in forces exerted on the actuator 40 to effect movement of the selected transducer to the target track, are eliminated to limit the excitation of resonant vibrations in the actuator and disc drive case.

FIGS. 2 and 6 also illustrate the manner in which an appropriate slew rate limit is selected. Because of the use of the slew rate limit, the actuator coil current will not rapidly attain the deceleration current used to design the velocity profile so that the velocity curve for the selected transducer will initially overshoot the portion 74 of the velocity profile 72 as shown by the portion 220 of the velocity curve 212 in FIG. 2. Thus, a control signal component calculated in accordance with equation (1) when the slew rate limit is imposed will generally attain larger values in interrupts during which the deceleration of the selected transducer takes place than would be the case for conventional seek methods. Consequently, the limitation on the rate of change of the control signal outputted to the actuator driver is accompanied by a corresponding increase in the maximum value the control signal will have and a consequent increase in the maximum current passed through the actuator coil as indicated by the peak 222 in the actuator current curve in FIG. 6. In order to insure that the actuator driver will be able to provide this peak current, the slew rate limit is selected to have a value which will result in a peak current which is within the maximum current supply capabilities of the actuator driver. Subject to this condition, the value of the slew rate limit can be selected on the basis of noise measurements during seeks made at the time of disc drive manufacture.

Description of the Second Embodiment

Like the first embodiment of the invention, the second embodiment is practiced by appropriate programming of the system and servo microprocessors, 50 and 62 respectively. Moreover, the programming of the microprocessors to implement the second embodiment is very similar to the programming of the microprocessors to implement the first embodiment with the result that a step-by-step description of the programming of the microprocessors 50 and 62 is not necessary to provide a complete description of the manner in which the second embodiment is carried out. Rather, the purpose of describing the second embodiment, it will suffice to identify steps in the flow charts presented in FIGS. 7, 8, 9A and 9B, by means of which the second embodiment is implemented, that are identical to steps that are carried out in the practice of the first embodiment with the numerals used in FIGS. 3, 4, 5A and 5B, briefly summarize these steps and discuss the differences between the flow charts that relate to differences in the manner in which the two embodiments are practiced.

Figure 7:
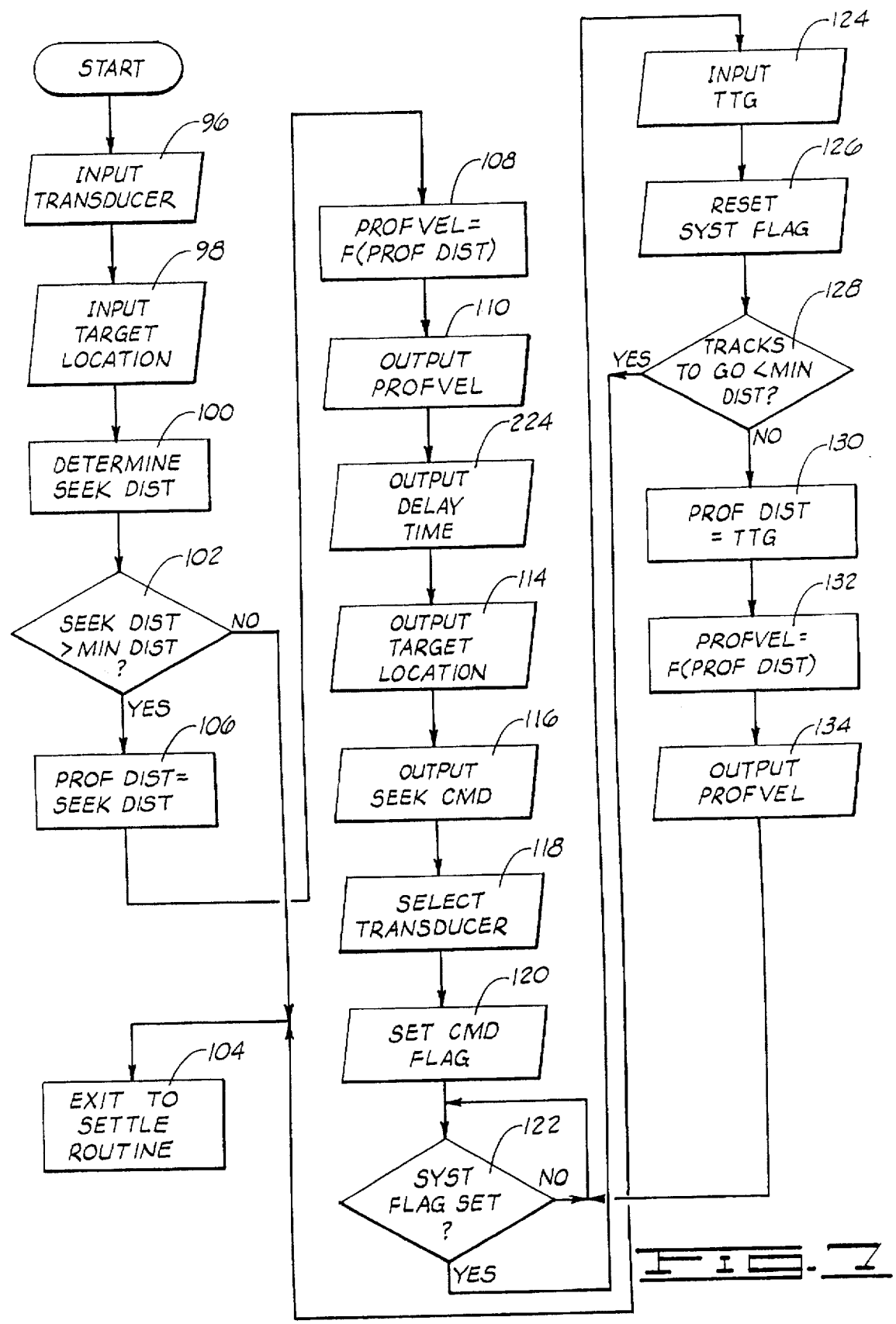
FIG. 7 is a flow chart of the system microprocessor programming for a second preferred embodiment of the present invention.

Referring to FIG. 7, shown therein is a flow chart, corresponding to the flow chart of FIG. 3, of the system microprocessor program used in the practice of the second embodiment of the present invention. As in the practice of the first embodiment, the movement of a selected transducer to a target track is commenced in response to a command received from the host computer 48 and the system microprocessor responds by inputting information needed to execute the movement, steps 96 and 98, and determining information, part of which is to be outputted to the servo microprocessor 62, to initiate the seek. In particular, the distance between the initial and target tracks is determined, step 100, and compared with the minimum distance, step 102, that determines whether the movement is to include a seek phase or to exit to settle routine as in the first embodiment. If not, an initial profile velocity is determined, steps 106 and 108, and outputted to the servo microprocessor 62, via the communications circuit 66, along with the target location and the seek command, steps 106, 108, 110, 114, 116. In the practice of the second embodiment of the invention, the information that is outputted to the communications circuit for use by servo microprocessor includes only one further quantity, a delay time that is outputted at a step 224 in FIG. 7. The use of this delay time, which is substantially half the time between interrupts of the servo microprocessor 62, will be described below. As in the case of the first embodiment, the transducer that is to store or retrieve a file following the movement is outputted to the transducer select circuit 42, step 118, and the command flag is set, step 120, so that the servo microprocessor 62 will commence the seek phase following the interrupt in which the seek command is received. The system microprocessor 50 then enters the previously described loop in which it responds to a set system flag, step 122, to determine and output a new profile velocity to the servo microprocessor 62 on the basis of the number of tracks to go received from the servo microprocessor, steps 124, 130, 132, and 134, or exits to the settle routine, step 128. Thus, the only difference between the system microprocessor programs for carrying out the seek phase of transducer movement for the first and second embodiments is that the program for the second embodiment includes the step of outputting the delay time, step 224 noted above, to the communications circuit 64 to be subsequently inputted by the servo microprocessor 62.

Referring to FIGS. 4 and 8, wherein are shown the routines executed by the servo microprocessor 62 in the first interrupt following the issuance of the seek command by the system microprocessor for the first and second embodiments respectively, the only difference between such routines is that the routine for the second embodiment includes the input of the delay time at the step 226 shown in FIG. 8. Thus, with the exception of the input of the delay time, the servo microprocessor 62 is initialized to execute the seek phase in a succession of subsequent interrupts for the second embodiment of the invention in exactly the same manner that the servo microprocessor is initialized to carry out the seek phase in the first embodiment.

Figure 9A:
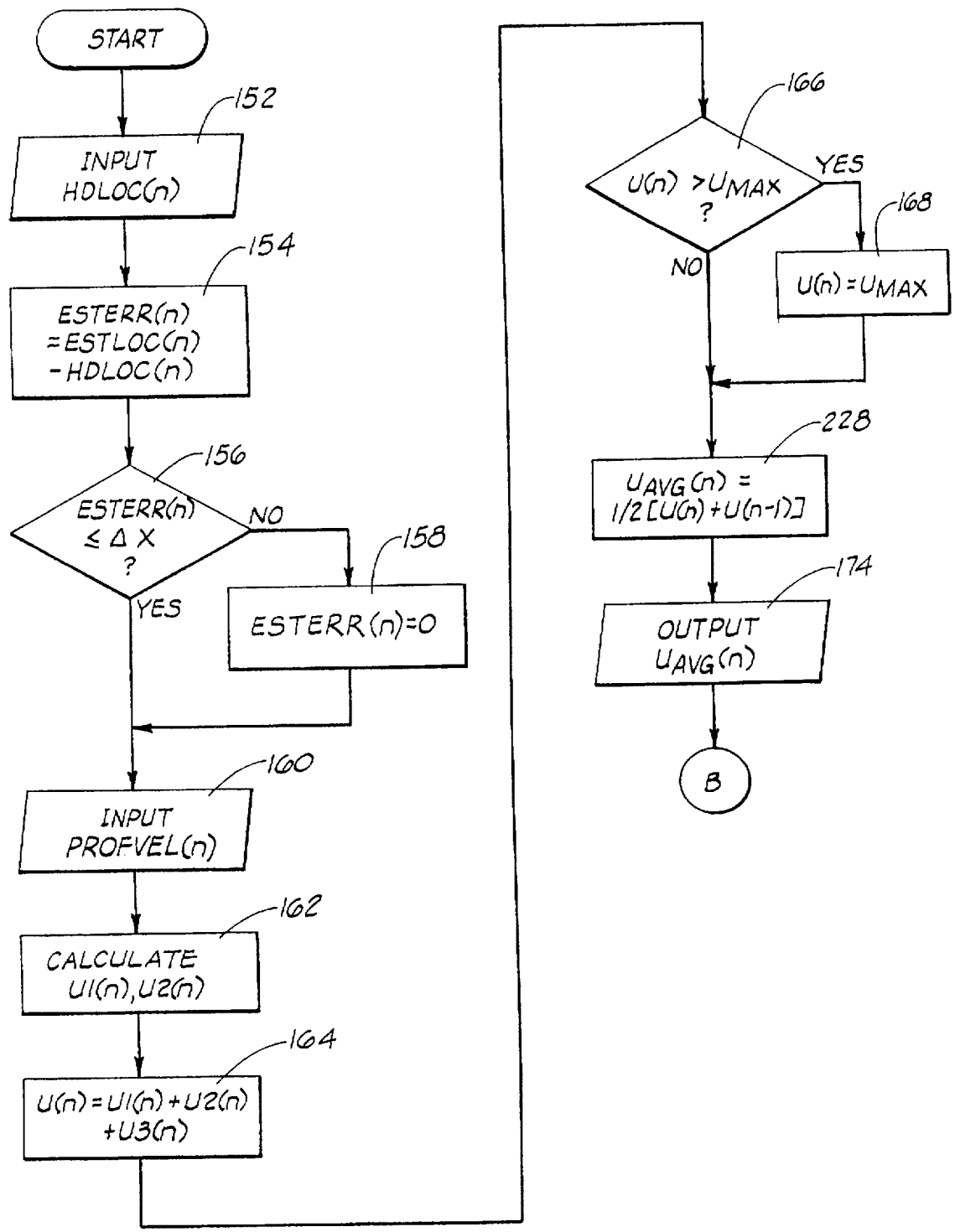
FIGS. 9A and 9B are flow charts of servo microprocessor routines repetitively carried out in the practice of the second preferred embodiment of the present invention.
Figure 9B:
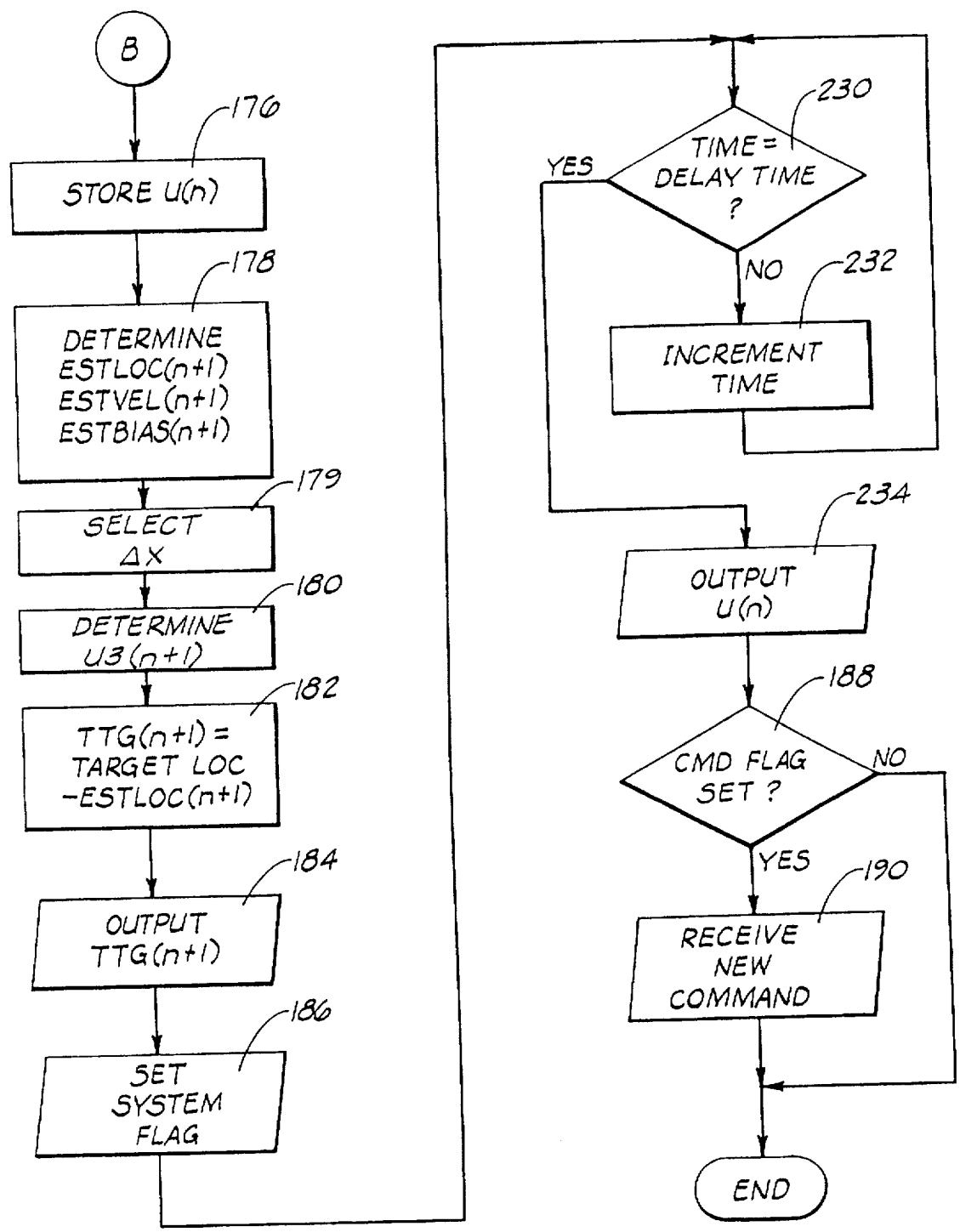

The routine that is repetitively executed, in successive interrupts of the servo microprocessor 62, during the seek phase of transducer movement in accordance with the second embodiment of the present invention has been illustrated in FIGS. 9A and 9B to which attention is now invited. In the second embodiment of the present invention, limitations on changes in the actuator current, changes that give rise to acoustic noise as described above, is effected by dividing each interrupt of the phase into two time intervals, each having a duration of substantially half the time between interrupts of the servo microprocessor 62, and adjusting the control signal determined for the interrupt in relation to the control signal for the previous interrupt in two stages. To this end, the control signal for the interrupt is determined and limited, steps 152, 154, 156, 158, 160, 162, 164, 166, and 168, in the practice of the second embodiment in exactly the same way that the control signal is determined and limited in the same steps of the first embodiment. The primary difference between the two embodiments is that, instead of slew rate limiting the control signal prior to output to the actuator driver, step 174, as shown in steps 170 and 172 in FIG. 5A for the first embodiment, the control signal in the second embodiment is averaged with the control signal for the previous interrupt, step 228, prior to output to the actuator driver 66 and the second embodiment includes additional steps which have been illustrated in FIG. 9B. As shown therein, following the storage of the control signal calculated for the present interrupt, estimation of the state at the beginning of the next interrupt, selection of the validation parameter Δx, determination of the third component of the control signal for the next interrupt, determination of the number of tracks to go at the beginning of the next interrupt, output of such number of tracks to go to the communication circuit 64 and setting of the system flag, steps 176, 178, 179, 180, 182, 184, and 186 in FIGS. 5B and 9B, the servo microprocessor 62 enters a loop, decision block 230 and time increment block 232, in which the servo microprocessor determines whether a time equal to the delay time has elapsed since the system flag was set. Once such time has elapsed, the servo microprocessor 62 outputs the control signal determined in the present interrupt to the actuator driver, step 234, prior to executing the check of the communication circuit 66 for a new command from the system microprocessor 50 and input of any new command at steps 188 and 190 shown in FIGS. 5B and 9B. Thereafter, as in the first embodiment, the interrupt ends.

Figure 10:
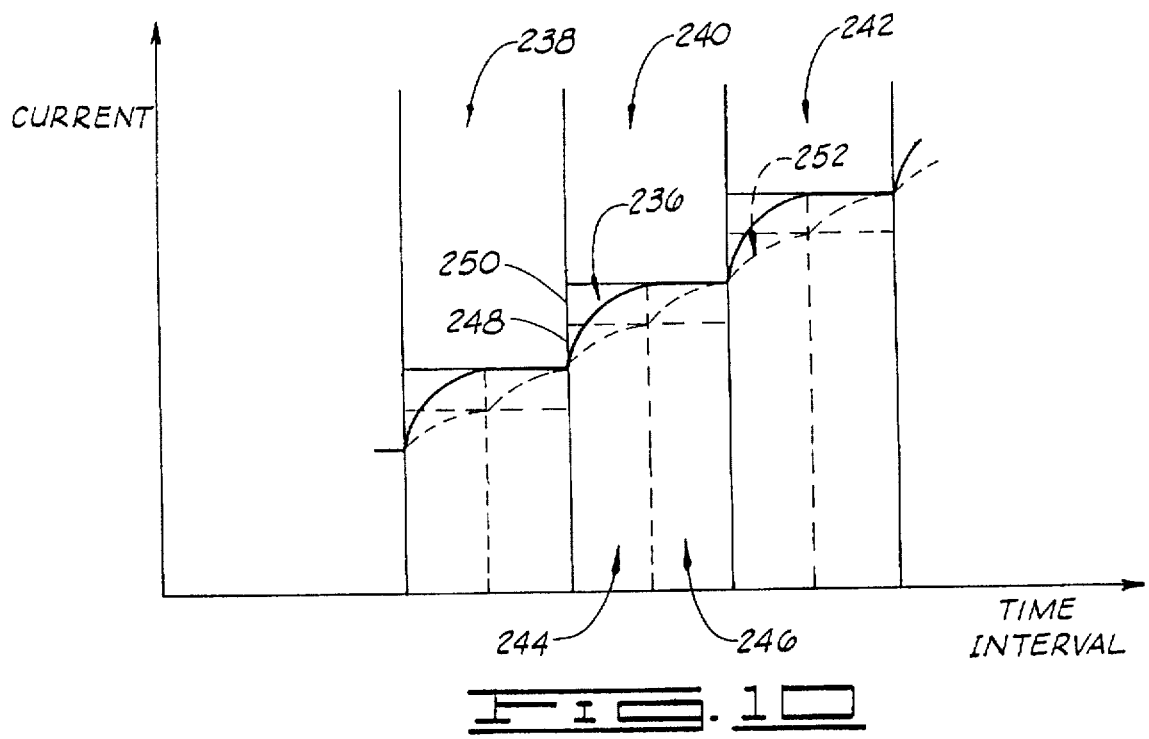
FIG. 10 is a fragmentary graph of actuator current versus time during a portion of the execution of the second embodiment of the present invention.

The manner in which acoustic noise is limited in the practice of the present invention in accordance with the second embodiment of the invention has been illustrated in FIG. 10. Before proceeding to this drawing, two points concerning the steps shown in FIG. 9B should be noted. As in the first embodiment, the location and velocity of the selected transducer at the beginning of the next interrupt are estimated, at step 178, in accordance with equations (5) and (6), and such equations include terms that represent changes in the location and velocity arising from the acceleration of the selected transducer. In the first embodiment, the control signal that gives rise to the acceleration is the slew rate limited control signal that is calculated for each interrupt and such control signal is maintained in a latch in the actuator driver 66 until a new control signal is outputted to the actuator driver in the next interrupt. In such embodiment, the coefficients B4 and B8 were selected to compensate for computation delay. In the second embodiment, values of these coefficients are selected to reflect the dependence of the control signal, and consequently the acceleration of the selected transducer, outputted at step 174 of FIG. 9A on the average of control signals determined in two successive interrupts of the servo microprocessor as well as computation delay.

The second point concerns the selection of the delay time. Preferably, the time between the output of the average control signal at step 174 of FIG. 9A and the output of the control signal determined for the present interrupt at step 234 of FIG. 9B is half the time between interrupts of the servo microprocessor 62. To achieve this timing, the delay time is selected to be half the time between interrupts of the servo microprocessor less the time required for execution of the steps 176, 178, 180, 182, 184, 186 and 230 of FIG. 9B by the servo microprocessor 62.

Referring now to FIG. 10, shown therein is a graph 236 of the current passed through the actuator coil 68 during each of a succession of time intervals, 238, 240 and 242, between successive updates of the control signal during the execution of the seek phase in accordance with conventional seek methods while the selected transducer is being accelerated away from the initial track or decelerated toward the target track. Conventionally, during either acceleration or deceleration of the transducers, the control signal will be changed by a discrete amount during each time interval with the result that the graph 236 of the actuator coil current will have the form of a series of arcs that each exhibit an initial rapid rise determined by the inductance and resistance of the actuator coil 68. Thus, during each interrupt, the actuator coil current and, consequently, the force applied to the actuator 40, will exhibit a rapid rate of change that acts as a series of blows delivered to the actuator. This series of blows can give rise to resonant vibrations of the actuator 40 and the disc drive case to result in the generation of noise during the seek phase of transducer movement. In accordance with the second embodiment of the present invention, each time interval is divided into two segments, as illustrated at 244 and 246 for the time interval 240, and any difference between the control signal determined for the time interval and the control signal determined for the previous time interval is applied in two increments, corresponding to current differences indicated at 248 and 250 in FIG. 10, to give rise to a substantially constant rate of change of the actuator coil current, and consequent rate of change of the force exerted on the actuator 40, illustrated by the dashed line 252 that will tend to minimize the generation of acoustic noise during the seek phase of transducer movement.

Description of the Third Embodiment

Figure 11A:
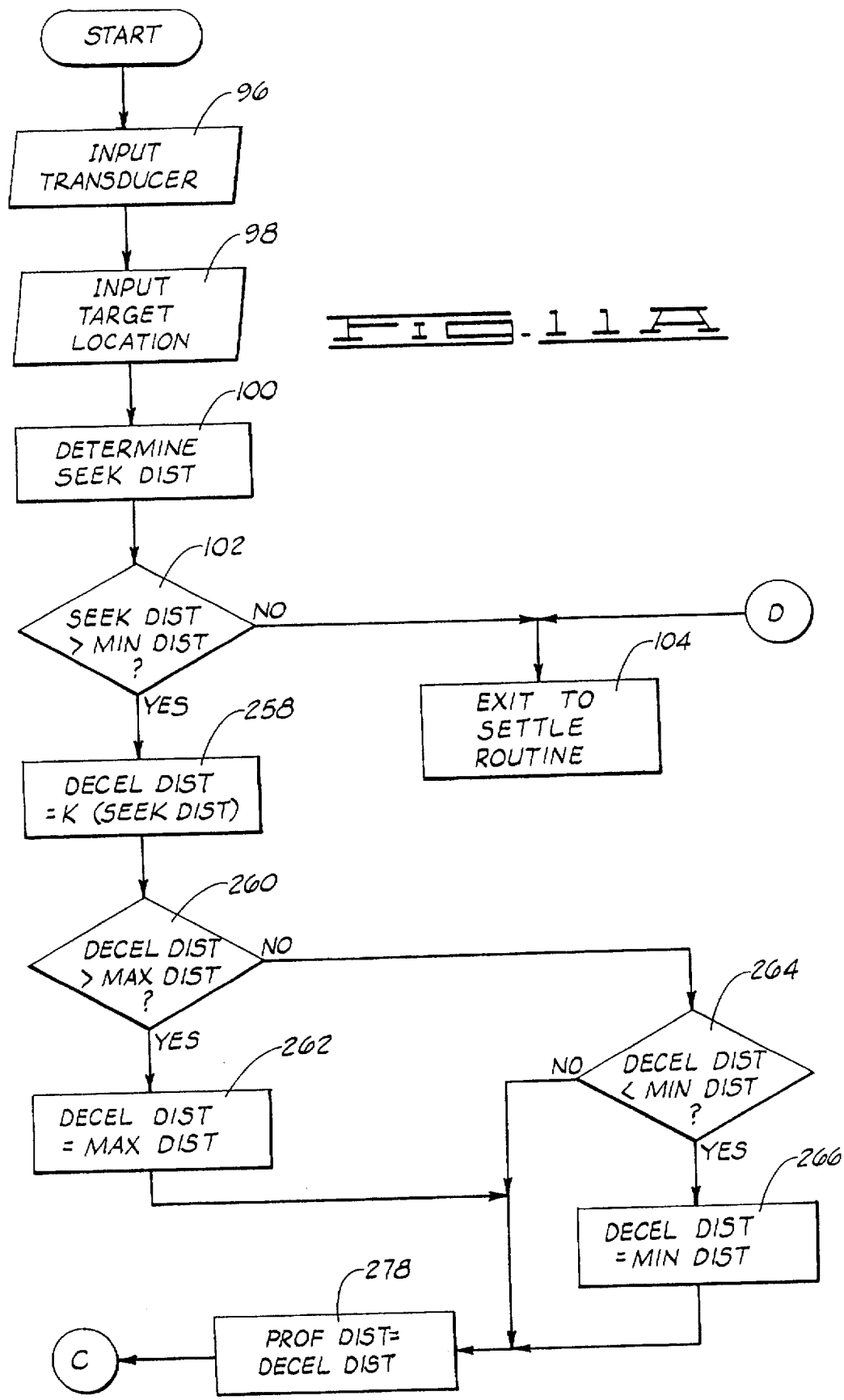
FIGS. 11A and 11B are flow charts of the system microprocessor programming for a third preferred embodiment of the present invention.
Figure 11B:
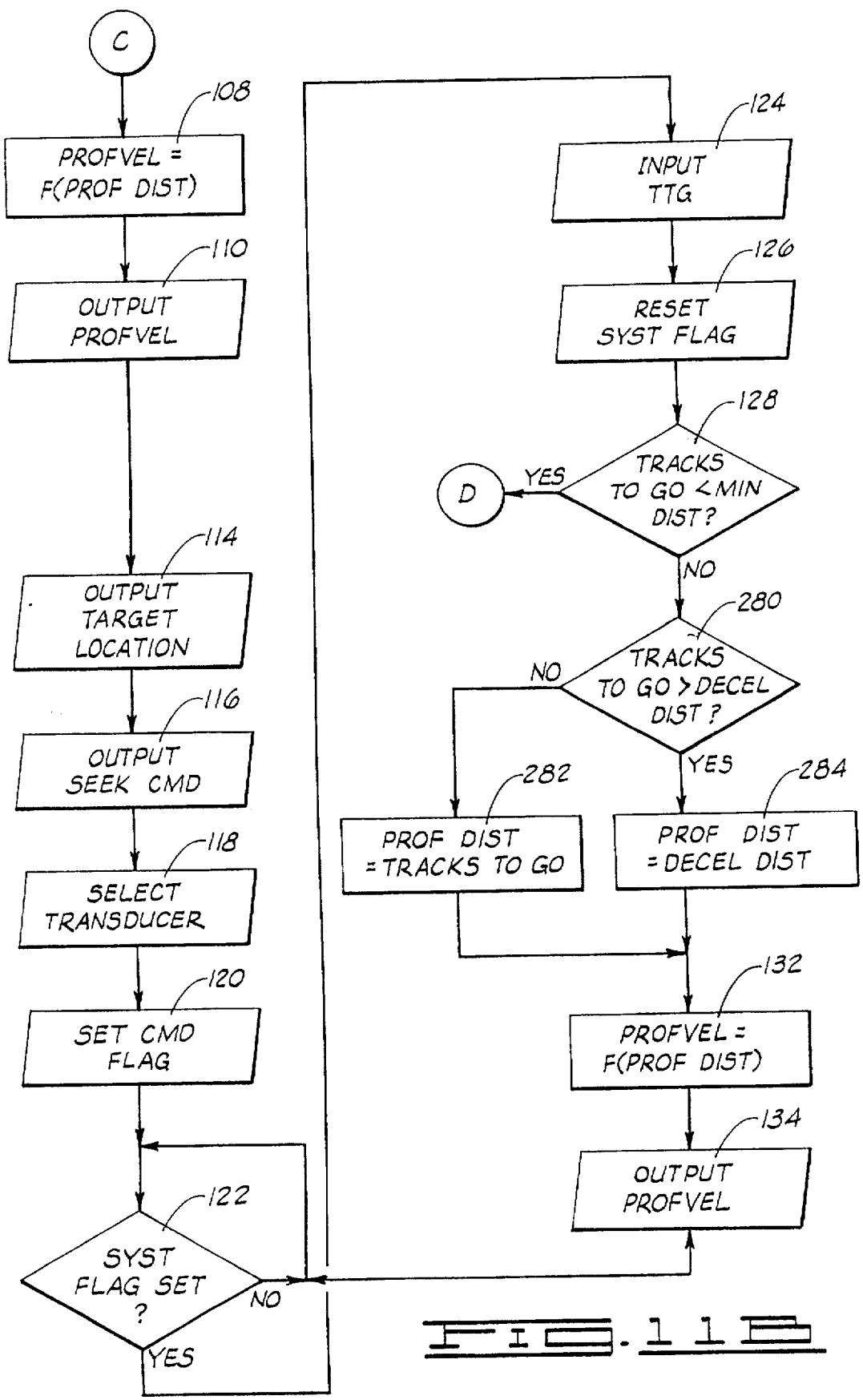
Figure 12:
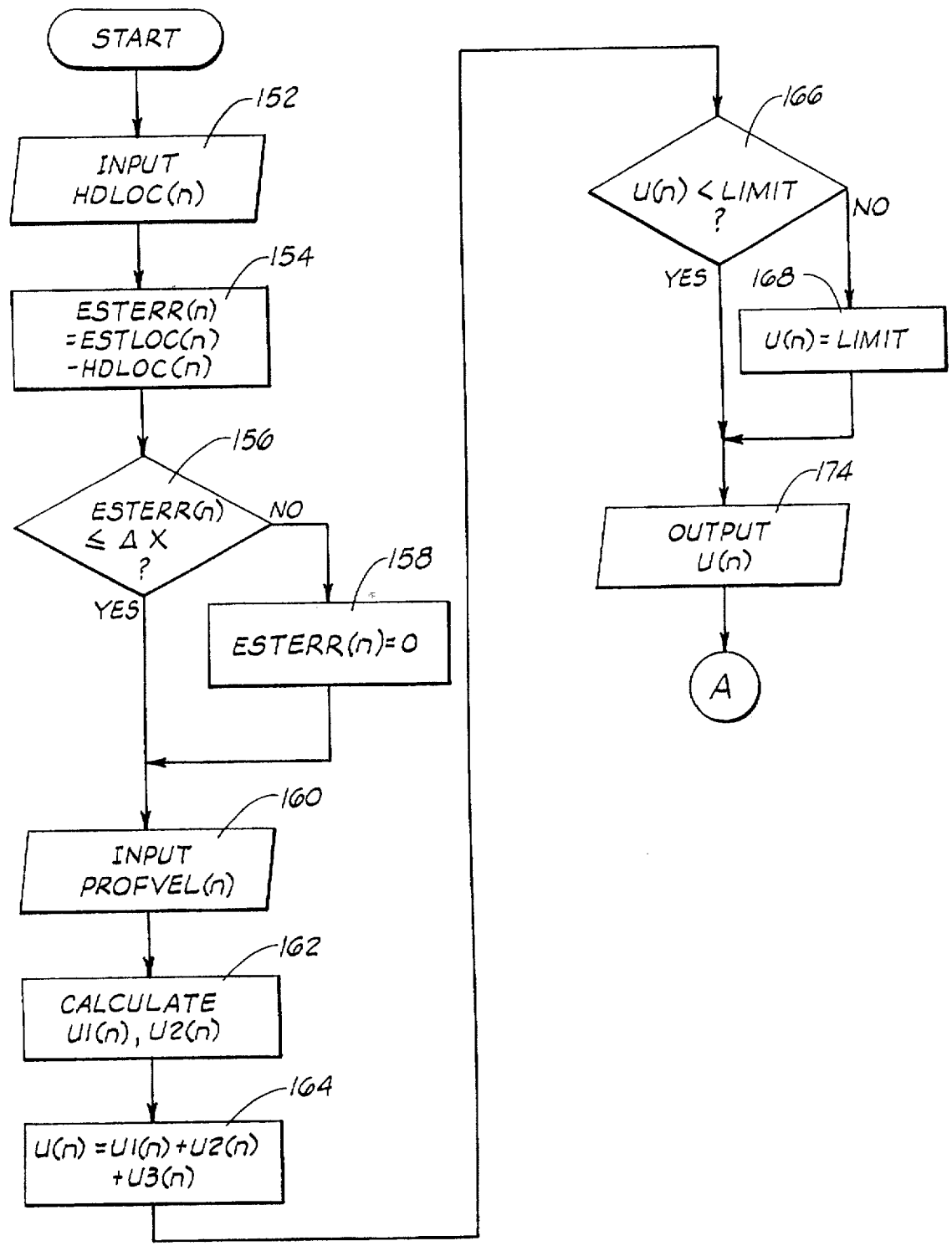
FIGS. 12 is a flow chart portions of the servo microprocessor routine repetitively carried out in the practice of the third preferred embodiment of the present invention.

Referring now to FIGS. 11A, 11B, and 12, shown therein are flow charts of routines carried out by the system and servo microprocessors, 50 and 62 respectively, in the practice of a third embodiment of the present invention. As in the case of the second embodiment, the third embodiment makes extensive use of previously described programming; consequently, it will facilitate an understanding of the invention to only briefly summarize such programming in the description of the present embodiment and to limit discussion of the flow charts presented in FIGS. 11A, 11B, 12 to differences between such flow charts and previously described flow charts. To this end, steps in FIGS. 11A, 11B, 12 that are identical to steps in FIGS. 35A have been numbered using the same numerical designations that have been used in FIGS. 3, 5A.

Referring first to FIGS. 11A and 11B, shown therein are flow charts of the system microprocessor 50 programming used to implement the third embodiment of the present invention. As in the case of the first embodiment of the present invention, the system microprocessor 50 responds to a seek command from host computer 48 by inputting the transducer that is to store or retrieve a file following movement of the transducer to a selected target track, step 96, inputting the target track address, step 98, determining the seek distance, step 100, and performing the check, step 102, to determine whether the distance to be traversed by the transducers in the movement of the selected transducer to the target track is greater than the minimum distance at which settle on the target track is effected and, if not, the system microprocessor 50 exits to the settle routine, step 104, so that the movement of the transducers will not include a seek phase prior to settling of the selected transducer on the selected track.

Figure 13:
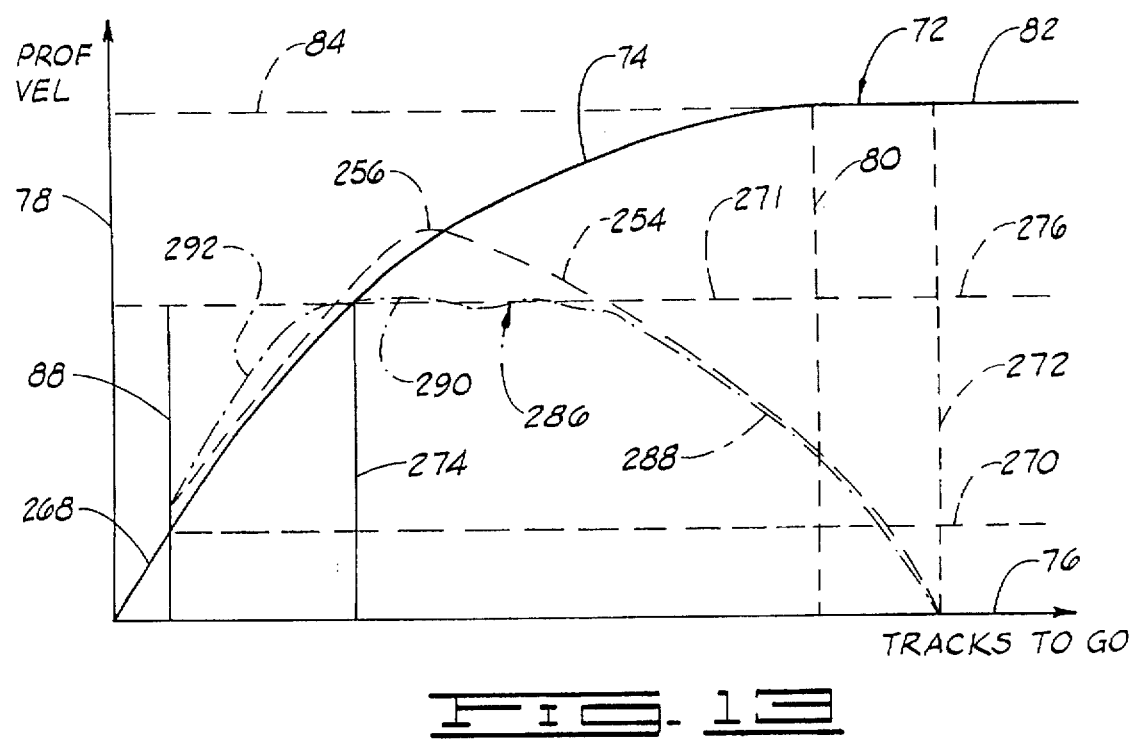
FIG. 13 is a graph of portions of the velocity profile illustrating the movement of transducers in the third preferred embodiment of the present invention.

In the third embodiment of the present invention, the generation of acoustic noise during the seek phase is limited in a manner that has been illustrated in FIG. 13 to which attention is now invited. FIG. 13 is a graph of terminal portions of the velocity profile 72 of FIG. 2 illustrating a source of noise that occurs during relatively short transducer movements in which the transducers do not attain the maximum profile velocity 84 prior to commencement of deceleration toward the target track. In such case, as illustrated by the curve 254, which is a graph of transducer radial velocity versus the number of tracks to go between the present transducer location and the target track, the transducers will be accelerated to a peak velocity, at 256 in FIG. 13, and, following attainment of such peak velocity, will rapidly undergo a transition to deceleration toward the target track. As a result, the current passed through the actuator coil 68 will undergo a rapid transition from a large current in one direction to a large current in the opposite direction. Consequently, the force applied to the actuator 40 during the seek phase undergoes a rapid reversal that can excite resonant resonances in the actuator 40 and the disc drive case to generate acoustic noise. The third embodiment of the invention prevents this rapid force reversal to minimize the resulting noise generation in a manner that will now be described with continuing reference to FIG. 13 and reference to FIGS. 11A, 11B, 12 and 5B.

In the practice of the third embodiment of the present invention, a deceleration distance is determined for each seek that is greater than the minimum distance 88 in FIGS. 2 and 13 by multiplying, step 258, the seek distance, determined at step 102, by a factor, less than 1, that is selected in a manner to be described below. The deceleration distance is then compared with the maximum distance 80 at which deceleration for lengthy seeks is to be commenced, step 260, and, if the deceleration distance is greater than the maximum distance 80, the deceleration distance is adjusted, step 262, to be the maximum distance 80 at which deceleration conventionally begins for lengthy transducer movements. If the deceleration distance is less than the maximum distance 80, the deceleration distance is compared, step 264, to the minimum distance 88 at which settle is to be commenced and, if the deceleration distance is less than the minimum distance 88, the deceleration distance is adjusted, step 266, to be the minimum distance 88. Otherwise the deceleration remains the product of the factor and the seek distance calculated at step 258.

As will become clear during the continuation of the discussion of the manner in which the transducer movement is effected in accordance with the third embodiment of the invention to follow, the selection of the deceleration distance as described above establishes an effective velocity profile to be used to generate control signals that are repetitively outputted to actuator driver 66 to effect the seek phase of movement of the transducers radially across the disc surfaces. More particularly, for lengthy seeks in which the deceleration distance is adjusted to the maximum distance 80 at which deceleration is to commence, the effective velocity profile is the velocity profile 72. For short transducer movements in which the deceleration distance is the minimum distance 88 at which settle is to begin, the effective velocity profile is comprised of portions of the velocity profile, indicated at 268 in FIG. 13, between the minimum distance 88 and the target track which is represented by the profile velocity axis 78 in FIG. 13 and a constant velocity portion, indicated at 270 in FIG. 13, for numbers of tracks to go that are greater than the minimum distance 88. For transducer movements of intermediate length, such as the distance indicated at 272 in FIG. 13, the effective velocity profile, generally indicated at 271 in FIG. 13, is comprised of a portion of the velocity profile 72 between the deceleration distance determined at step 258 of FIG. 11A, such distance indicated at 274 for the seek distance 272 in FIG. 13, and the target track, and a constant velocity portion 276 for numbers of tracks to go that are greater than the deceleration distance 274.

Returning to FIG. 11A, once the deceleration distance has been determined, such distance is selected, step 278, to be the profile distance used to determine, at step 108 of FIG. 11B, the initial profile velocity to be used in generating the control signal in the first interrupt of the servo microprocessor in which the transducer movement commences. As in the previously described embodiments of the invention, and with reference to FIG. 11B, the system microprocessor then outputs the initial profile velocity to the servo microprocessor 62, via the communications circuit 64, along with the target track location and the seek command, steps 110, 114 and 116 respectively, outputs a transducer selection signal to the head select circuit 42, step 118, sets a command flag, step 120, in the communication circuit 64, and turns to polling of the communications circuit 64, step 122, as has been described above with respect to FIG. 3.

When the system microprocessor 50 subsequently detects the set system flag at step 122, the system microprocessor 50 will, as in the embodiment of the invention described with respect to FIG. 3, input the number of tracks to go, step 124, to the target track at the next interrupt of the servo microprocessor 62, reset the system flag, step 126, and determine whether the minimum distance between the transducers and the target track at which settle is to be commenced will have been attained at the beginning of the next servo microprocessor interrupt, step 128, and, if so, exit to the settle routine as indicated by the program connectors labeled "D" in FIGS. 11A and 11B. If the number of tracks to go to complete the transducer movement to the target track is greater than minimum distance at which settle is to commence, the system microprocessor 50 determines and outputs a new profile velocity to the servo microprocessor 62. More particularly, the system microprocessor 50 initially compares the number of tracks to go to the deceleration distance, step 280, and selects the smaller of these two distances, steps 282 and 284, as the profile distance to be used, with the velocity profile 72, to determine the profile velocity at step 132. This profile velocity is then outputted to the servo microprocessor 62, step 134, and the system microprocessor 50 returns to polling the communications circuit 64 for the system flag in the manner that has been previously described with respect to FIG. 3.

The selection of the profile distance to be the smaller of the deceleration distance and the number of tracks to go at steps 280, 282 and 284, and the use of the velocity profile 72 to determine the profile velocity have the effect of causing determination of the profile velocity, for the number of tracks to go inputted at step 124, from the effective velocity profile determined from the deceleration distance as described above as will now be explained with reference to FIG. 13 for the case in which the effective velocity profile is the velocity, profile 271. At such times that the number of tracks to go exceeds the deceleration distance 274, the selection of the deceleration distance as the profile distance to be used to calculate the profile velocity will cause the profile velocity to be the value the profile velocity will have for the distance 274; that is, the value for the constant velocity portion 276 of the effective velocity profile 271. Thus, until the transducers attain the distance 274 from the target track, the profile velocity will be the constant velocity 274 that would be determined using the effective velocity profile 271. Once the number of tracks to go for the transducers reaches the deceleration distance 274, so that the number of tracks to go is less than the deceleration distance, the number of tracks to go will be used, with the velocity profile 72, to determine the profile velocity. But, for distances less than the deceleration distance, the effective velocity profile coincides with the velocity profile 72. Hence, use of the velocity profile 72 to determine the profile velocity will have the effect of using the effective velocity profile 271 to determine the profile velocity. Thus, for any number of tracks to go inputted at step 124, the profile velocity that is outputted at step 134 is a velocity that would be determined from the effective velocity profile 271.

Curve 286 in FIG. 13, drawn for transducer movement that is initiated from the distance 272 utilized to develop the effective velocity profile 271, illustrates the manner in which the third embodiment of the invention minimizes the generation of acoustic noise in the movement of the transducers to the target track. To this end, the factor by which the seek distance is multiplied at step 258 in FIG. 11A to determine the deceleration distance for the transducer movement is selected to insure that the transducers will attain a radial velocity across the disc surface that is equal to the velocity 276 of the effective velocity profile 271 before the deceleration distance 274 is reached. Thus, the transducers will initially accelerate, as indicated by the portion 288 of curve 286 to the velocity 276 of the effective velocity profile 271 and then move at substantially constant velocity, as indicated at 290 until the deceleration distance 274 is reached. The transducers will then decelerate to substantially follow the terminal portions of the velocity profile 72 as indicated by the portion 292 of the transducer velocity curve 286. The inclusion of a constant velocity stage of movement between acceleration and deceleration of the transducers eliminates the sharp transition from acceleration to deceleration, illustrated in FIG. 13 for the velocity curve 254 made in accordance with conventional methods, to limit the above noted rapid transition of forces exerted on the actuator 40 from a large force in one direction to a large force in the opposite direction.

The value of the factor used to determine the deceleration distance from the seek distance can be readily determined during the manufacture of the disc drive 20. As noted above with respect to the lengthy seek illustrated in FIG. 2, the current, shown in FIG. 6, that is passed through the actuator coil 68 while the transducers are moving at constant velocity is substantially zero. Thus, a suitable factor for determining the deceleration distance from the seek distance can be determined by observing the actuator coil current for a selection of seeks and a selection of factors and selecting the factor to be the largest value for which the actuator coil current will exhibit a null between the two portions of the current versus time curve corresponding to acceleration and deceleration of the transducers.

As in the case of the previously described embodiments of the invention, the programming of the servo microprocessor 62 to effect the third embodiment of the present invention includes an interrupt routine in which the transducer movement is initialized and an interrupt routine which is then repetitively executed as the transducers are accelerated away from the initial track and subsequently decelerated to the minimum distance 88 at which a transition to settle is to occur. In the case of the third embodiment, the initialization routine is used to input the seek command issued by the system microprocessor, select the validation parameter $\Delta x$ and input the target track location so that the routine that has been previously described for the first embodiment of the invention with reference to FIG. 4 applies equally well to the third embodiment. The servo microprocessor interrupt routine that is repetitively executed during movement made in accordance with the third embodiment of the invention has been illustrated in FIGS. 12 and 5B.

Referring to FIG. 12, the interrupt routine that is executed during the seek phase of transducer movement is a simplification of the routine that has been illustrated in FIGS. 5A and 5B for the first embodiment of the invention. Since the practice of third embodiment of the invention does not contemplate the determination of a control signal in each interrupt that makes use of the control signal determined in the previous interrupt, the programming of the servo microprocessor 62, for the repeated interrupts, can be derived from the programming shown in FIGS. 5A by deleting steps 170 and 172 shown in FIGS. 5A. Thus, as illustrated in FIGS. 12, during each interrupt of the servo microprocessor 62, the servo microprocessor 62 will begin by inputting the location of the selected transducer, step 152, determining the error of the estimation of the previously estimated transducer location, step 154, validating the transducer location, steps 156 and 158, and inputting the profile velocity, step 160, from the system microprocessor 50 via the communications circuit 64 as has been described above. The control signal will then be determined, steps as also described above, steps 162 and 164, limited, steps 166 and 168, and outputted to the actuator driver 66, step 174. Thereafter, in each interrupt during the seek phase, the servo microprocessor 62 carries out the steps shown in FIG. 5B that have been described above.

Description of the Fourth Embodiment

In the fourth embodiment of the invention, the previous embodiments are combined into a single method that provides the noise limitation capabilities of each of the previous embodiments. To this end, the system and servo microprocessors, 50 and 62, respectively are programmed to carry out operations that are common to each of the three previously described embodiments as well as operations that are specific to each. Consequently, it will facilitate an understanding of the present invention to refer to previously presented flow charts, where applicable, point out features of these flow charts by means of which the previously described methods are combined, and present only those new flow charts which are specific to the fourth embodiment. As in the case of the descriptions of the previous embodiments, operations of the microprocessors that are common to more than one embodiment will be identified by common reference numerals.

Figure 14:
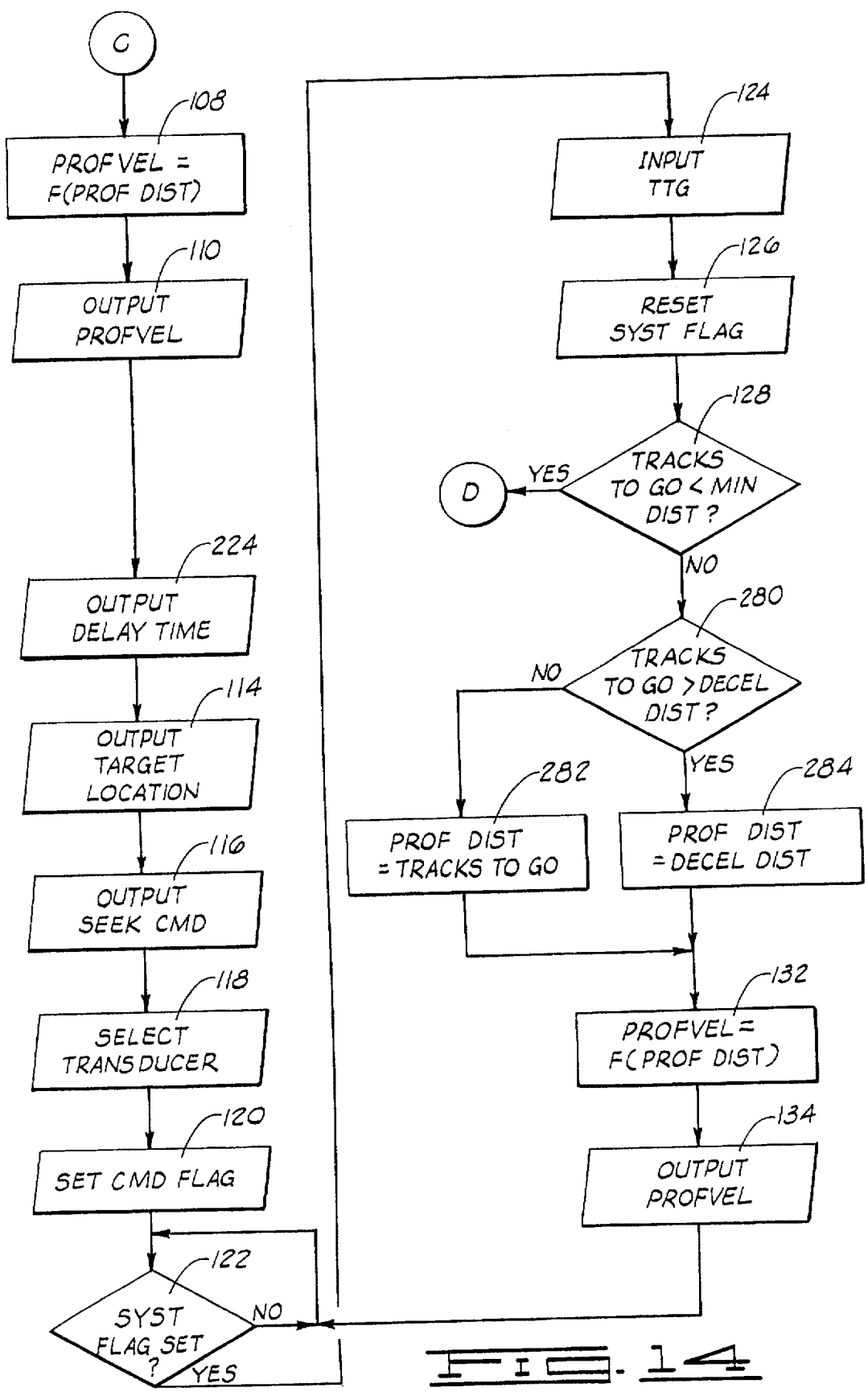
FIG. 14 is a flow chart of a portion of the system microprocessor programming for a fourth preferred embodiment of the present invention.

The programing of the system microprocessor 50 to effect movement of the transducers from an initial track being followed at the time a seek command is received from the host computer 48 is illustrated in the previously described flow chart present in FIG. 11A and the additional flow chart presented in FIG. 14. Referring first to FIG. 11A, the system microprocessor 50 initially carries out the steps 96, 98, and 100, common to all embodiments, to determine the seek distance and then carries out the step 102, also common to all embodiments, to determine whether movement of the transducers is to include a seek phase and, if not, exits to the settle routine at step 104.

Following execution of these steps that are common to all embodiments of the invention, the system microprocessor determines the deceleration distance as described above for the third embodiment, steps 258, 260, 262, 264, and 266, so that the seek phase will be carried out using an effective velocity profile as described above with reference to FIG. 13. Similarly, as in the third embodiment of the invention, the value of the profile distance to be initially utilized in the determination of a profile velocity to be outputted to the servo microprocessor 62 via the communications circuit 64 is selected, step 278, to be the deceleration distance determined by the steps 260, 262, 264 and 266.

Referring to FIG. 14, following selection of the profile distance to be used to determine the initial profile velocity, the system microprocessor caries out the steps 108, 110, 114, 118, 116 and 120, common to all embodiments, to command the servo microprocessor 62 to execute the seek phase and provide parameters, again common to all embodiments of the invention, utilized in the execution of the seek phase to the servo microprocessor 62. Additionally, to incorporate the control signal averaging feature of the second embodiment into the fourth embodiment, the system microprocessor 50 outputs, step 224, the delay time after which the control signal determined in an interrupt during the seek phase is to be outputted to the actuator driver 66 after an initial output of the average of such control signal with the control signal determined in the previous interrupt. During this initial portion of the system microprocessor 50 program, the selected head is outputted, step 118, to the head select circuit 42 as described above and the system microprocessor then commences polling of the communications circuit 64, step 122, as has been previously described.

When the system microprocessor 50 detects a set system flag, the system microprocessor will execute the steps 124, 126 and 128, common to all embodiments of the invention, to enable exit of the system microprocessor 50 to the settle routine as indicated by the program connector "D" that corresponds to the program connector "D" of FIG. 11B. The system microprocessor 50 then selects the number of tracks to go that it has received from the servo microprocessor 62 or the deceleration distance, steps 280, 282, and 284 as the profile distance to be used to calculate the next profile velocity so that the profile velocity determined for succeeding interrupts of the system microprocessor will be the profile velocity determined in accordance with the third embodiment of the invention as described above. This profile velocity is then determined, step 132, and outputted to the servo microprocessor 62, step 134, following which the system microprocessor 50 returns to polling of the communications circuit 64 for a set system flag.

Figure 15:
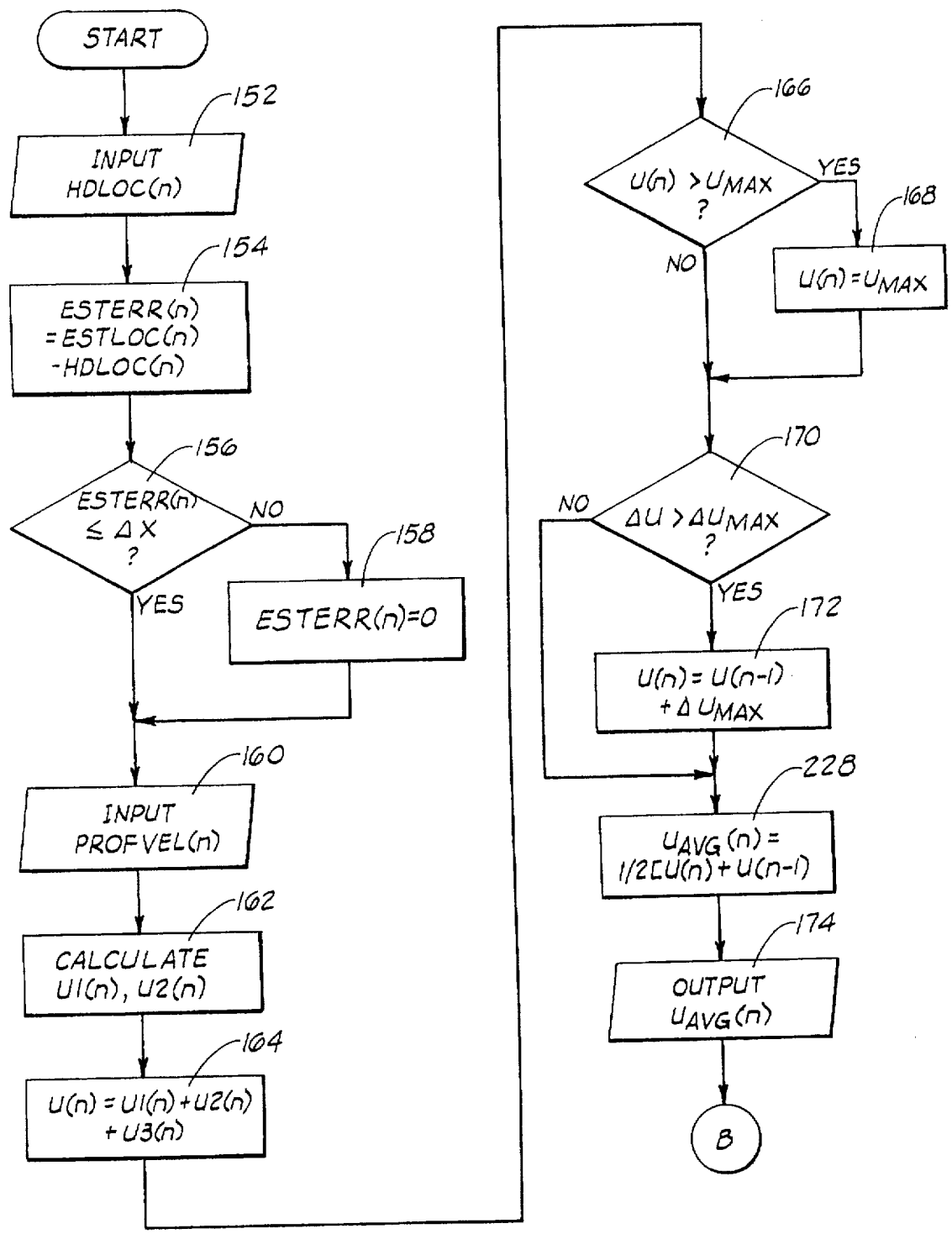
FIG. 15 is a flow chart of a portion of servo microprocessor routines repetitively carried out in the practice of the fourth preferred embodiment of the present invention.

Flow charts that illustrate the operation of the servo microprocessor during initialization of the transducer movement and the during interrupt routines that are repetitively executed during the seek phase of movement are the flow chart presented in FIG. 8, for seek initialization, a flow chart presented in FIG. 15 and the flow chart previously presented in FIG. 9B. Referring first to FIG. 8, the initialization of the servo microprocessor 62 is effected, following a final execution of the track follow control routine 136, by execution of the state estimation step 138, the calculation of the third component of the control signal for the next interrupt, step 140, and the input of the seek command, step 144, the selection of the validation parameter Δx, step 146, and the input of the target location, step 148, that are common to all embodiments of the invention. In addition, to incorporate the control signal averaging feature of the second embodiment, the delay time that is to lapse before output of the control signal calculated in an interrupt of the servo microprocessor 62, following output of the average of such control signal and the control signal determined in the previous interrupt, is inputted at step 226 of FIG. 6.

The initial control signal to be outputted to the actuator driver 66 in the practice of the fourth embodiment of the invention is generated in a manner that has been illustrated in FIG. 15. Prior to determining the initial control signal, the steps 152, 154, 156, 158 and 160, common to all embodiments of the of the invention, are executed to obtain the profile velocity used in determining a control signal and to obtain information that will be subsequently used to estimate the state of the servo system at the beginning of the next interrupt. The control signal is then determined, steps 162 and 164, and limited, as described for the first embodiment of the invention. Following determination of the control signal, the control signal is slew rate limited, steps 170 and 172, to incorporate the first embodiment of the invention into the fourth embodiment, and averaged with the slew rate limited control signal determined in the previous interrupt of the servo microprocessor 62 to incorporate the second embodiment of the invention into the fourth embodiment. This average control signal is then outputted to the actuator driver 66.

The remaining steps of the servo microprocessor 62 interrupt routine are then carried out as illustrated for the second embodiment as shown in FIG. 9B. Specifically, following storage of the slew rate limited control signal determined for the interrupt at hand, step 176, to enable incorporation of both the first and second embodiments of the invention to be incorporated into the fourth embodiment, the state of the servo system is estimated, step 178, as in previously described embodiments, the validation parameter Δx is selected, step 179, the third component of the control signal is estimated, step 180, and the estimated number of tracks to go at the beginning of the next interrupt is calculated and outputted to the system microprocessor 50 along with setting of the system flag, steps 182, 184 and 186, to enable the system microprocessor to determine the profile velocity that will be used to determine the first component of the control signal by the servo microprocessor 62 in the next interrupt of the servo microprocessor 62. It will be noted that, since the control signal averaging feature of the second embodiment of the invention is incorporated into the fourth embodiment, the coefficients B4 and B8 in equations (5) and (6) that are utilized to estimate the state of the servo system at the beginning of the next interrupt will be nonzero values that reflect the use of two control signals in the present interrupt to determine the current passed through the actuator coil 68 as described above for the second embodiment of the invention.

The servo microprocessor 62 then enters the delay loop 230, 232 described for the second embodiment and outputs the slew rate limited control signal determined for the current interrupt to incorporate the second embodiment of the invention into the fourth embodiment. The interrupt then ends with the steps, common to all embodiments, of checking for a new command flag, step 188, and, if such flag is set, receiving a new command, step 190, from the system microprocessor 50.

The slew rate limit and the factor utilized to determine the deceleration length are determined as described above for the first and third embodiments of the invention. However, it will be noted that the use of a slew rate limit will lead to a control signal that is less than the control signal that would be determined using only the third embodiment. Thus, to insure that the factor used to determine the deceleration length will be low enough to ensure that a coast stage will occur between acceleration and deceleration of the transducers, such factor is determined for use in the fourth embodiment of the invention after determination of the slew rate limit and for seeks that are carried out employing both the slew rate limit and the control signal averaging that are incorporated into the fourth embodiment from the first and second embodiments respectively.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for carrying out a seek phase in the movement of a disc drive transducer from an initial track on a rotating disc to a target track on the disc so as to reduce noise generated during the seek phase, wherein the transducer is supported adjacent the surface of the disc by a pivotable actuator for radial movement of the transducer via pivotation of the actuator, comprising the steps of:

repetitively estimating the distance between the transducer and the target track; and for each estimated distance between the transducer and the target track, the steps of:

evaluating a preselected velocity profile relation at the estimated distance between the transducer and the target track;

estimating the radial velocity of the transducer across said disc;

generating a control signal comprising at least a component proportional to the difference between estimated radial velocity of the transducer and the profile velocity;

averaging the control signal with the control signal generated from the previous estimated distance between the transducer and the target track;

exerting a force on the actuator in proportion to said average control signal for a selected time period; and subsequently exerting a force on the actuator in proportion to said control signal.

2. The method of claim 1, wherein each step of estimating the distance between the transducer and the target track comprises the steps of:

estimating the radial location of the transducer with respect to the disc; and determining the distance between the target track and the estimated location of the transducer; and wherein the method further comprises the steps of:

repetitively measuring the radial location of the transducer with respect to the disc; and determining the difference between the estimated and measured locations of the transducer; and wherein the step of generating a current control signal further comprises the steps of:

generating a second component of the control signal in relation to the difference between said estimated and measured locations of the transducer; and adding the second component of the control signal to said component proportional to the difference between the estimated radial velocity of the transducer and the profile velocity.

3. The method of claim 2, further comprising the step of repetitively estimating a bias torque on the actuator; and wherein the step of generating a current control signal further comprises the steps of:

generating a third component of the current control signal in relation to the estimated bias torque; and adding the third component of the current control signal to said second component and said component proportional to the difference between the estimated radial velocity of the transducer and the profile velocity.

4. In a method for carrying out a seek phase in the movement of a disc drive transducer from an initial track on a rotating disc to a target track on the disc, wherein the transducer is supported adjacent the surface of the disc by a pivotable actuator for radial movement of the transducer via pivotation of the actuator, said method including the steps of:

repetitively estimating the distance between the transducer and the target track; and for each estimated distance between the transducer and the target track, the steps of:

evaluating a preselected velocity profile relation at the estimated distance between the transducer and the target track;

estimating the radial velocity of the transducer across said disc;

generating a control signal comprising at least a component proportional to the difference between estimated radial velocity of the transducer and the profile velocity; and exerting a force on the actuator in proportion to said control signal, the improvement wherein the method further comprises the steps of:

for each estimated distance between the transducer and the target track, the steps of:

averaging the control signal with the control signal generated from the previous estimated distance between the transducer and the target track; and exerting a force on the actuator in proportion to said average control signal for a selected time period prior to said step of exerting a force on the actuator in proportion to said control signal.

5. A method for carrying out a seek phase in the movement of a disc drive transducer from an initial track on a rotating disc to a target track on the disc so as to reduce noise generated during the seek phase, wherein the transducer is supported adjacent the surface of the disc by a pivotable actuator for radial movement of the transducer via pivotation of the actuator, comprising the steps, executed in each of a sequence of control cycles, of:

estimating the distance that will exist between the transducer and the target track at the beginning of the next control cycle;

evaluating a preselected velocity profile relation at such estimated distance between the transducer and the target track to obtain a profile velocity for the next control cycle;

estimating the radial velocity across the disc that the transducer will have at the beginning of the next control cycle;

generating a present control cycle control signal comprising at least a component that is proportional to the difference between the radial velocity of the transducer estimated for the beginning of the present control cycle, said velocity estimate having been made in the previous control cycle, and the profile velocity determined from the estimate of the distance between the transducer and the target track at the beginning of the present control cycle, said distance estimate having been made in the previous control cycle;

averaging the present control cycle control signal with the control signal that was generated in the previous control cycle to obtain an average control signal for the present control cycle;

exerting a force on the actuator in proportion to said average control signal for a selected time period during the control cycle in which the average is made; and thereafter exerting a force on the actuator in proportion to the present control cycle control signal until the time in the next control cycle at which a force is to be again exerted on the actuator in proportion to an average control signal.

* * * * *